United States Patent [19]

Jain

[11] Patent Number: 5,477,383

[45] Date of Patent: Dec. 19, 1995

[54] OPTICAL ARRAY METHOD AND APPARATUS

[75] Inventor: Anil K. Jain, North Oaks, Minn.

[73] Assignee: APA Optics, Inc., Blaine, Minn.

[21] Appl. No.: 14,418

[22] Filed: Feb. 5, 1993

[51] Int. Cl.$^6$ .............................. G02B 5/18; G02B 27/44
[52] U.S. Cl. ...................... 359/565; 359/573; 359/575
[58] Field of Search ........................... 359/17, 201, 202, 359/565, 621, 622, 623, 566, 569, 571, 573, 575

[56] References Cited

U.S. PATENT DOCUMENTS

| | | | |
|---|---|---|---|
| 4,305,643 | 12/1981 | Tosswill | 359/623 |
| 4,456,783 | 6/1984 | Baker | 359/623 |
| 4,867,514 | 9/1989 | Waldron | 350/1.1 |
| 4,878,735 | 11/1989 | Vilums | 359/565 |
| 5,059,008 | 10/1991 | Flood et al. | 359/196 |
| 5,258,862 | 11/1993 | Harris | 359/565 |
| 5,291,319 | 3/1994 | Harris | 359/565 |

OTHER PUBLICATIONS

Swanson, G. J., "Binary Optics Technology: The Theory and Design of Multi-Level Diffractive Optical Elements," Technical Report 854, Massachusetts Institute of Technology, 14 Aug. 1989, Lexington, Mass., pp. iii to 47.

Ivan N. Cindrich et al., "Holographic Optics: Optically and Computer Generated", Proceedings, SPIE—The International Society for Optical Engineering, vol. 1052, 19–20 Jan. 1989, Los Angeles, California.

*Primary Examiner*—Martin Lerner
*Attorney, Agent, or Firm*—Merchant, Gould, Smith, Edell, Welter & Schmidt

[57] ABSTRACT

A method and apparatus for splitting, scanning and receiving a beam of light is disclosed. Binary optic array components are used to split, in an angular manner, an input beam into multiple beams, traveling in different directions. Miniaturized array element BOCs arranged in "n" different groups are used, wherein n is dependent upon the number of split beams needed or desired. An offset is introduced between the optical axis of each of the corresponding pair of miniaturized BOCs. By varying the offset over time, the resultant beam(s) can be scanned in one, two or three dimensions. Piezo-electric drivers controlled by a processor may be used to move the array in order to vary the offset. The device may also include a collection area to collect the returned scanned beams by using an array of optic components integrated with the scanner. The collected beams are then focused onto detectors.

15 Claims, 21 Drawing Sheets

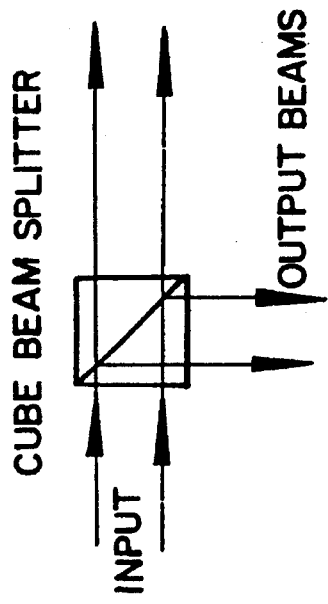
FIG. 5B CUBE BEAM SPLITTER
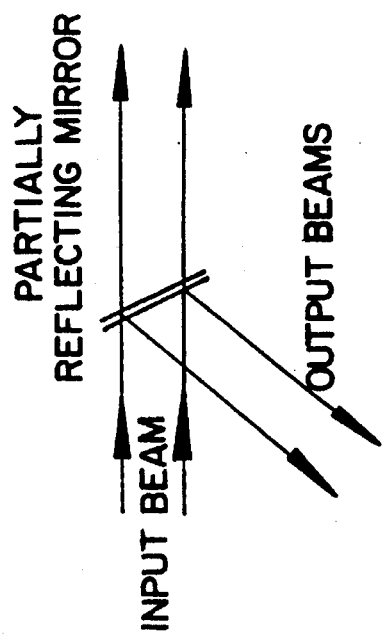
FIG. 5A PARTIALLY REFLECTING MIRROR
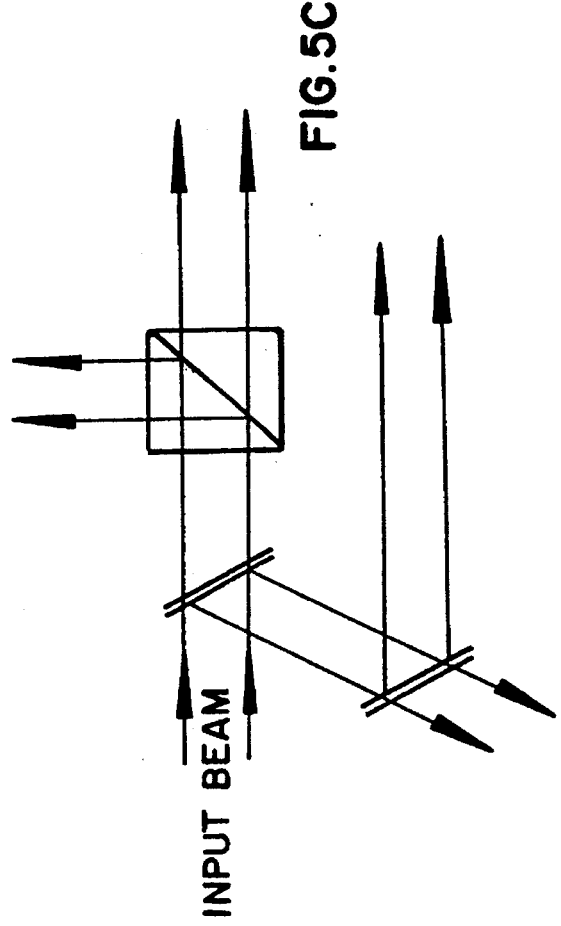
FIG. 5C

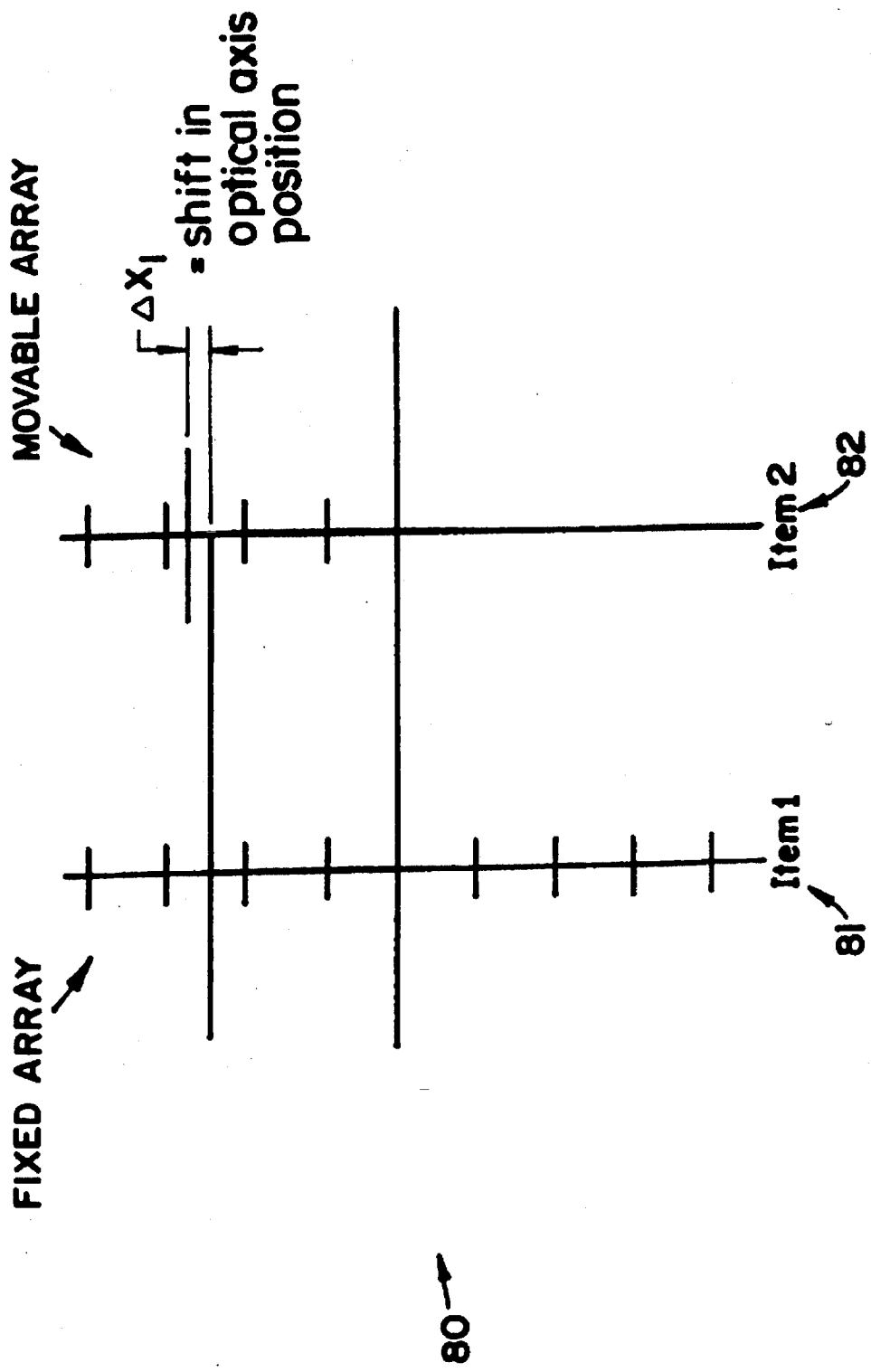

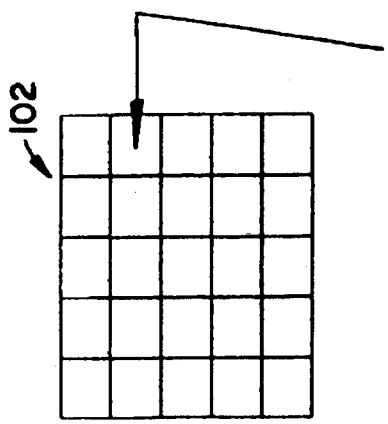
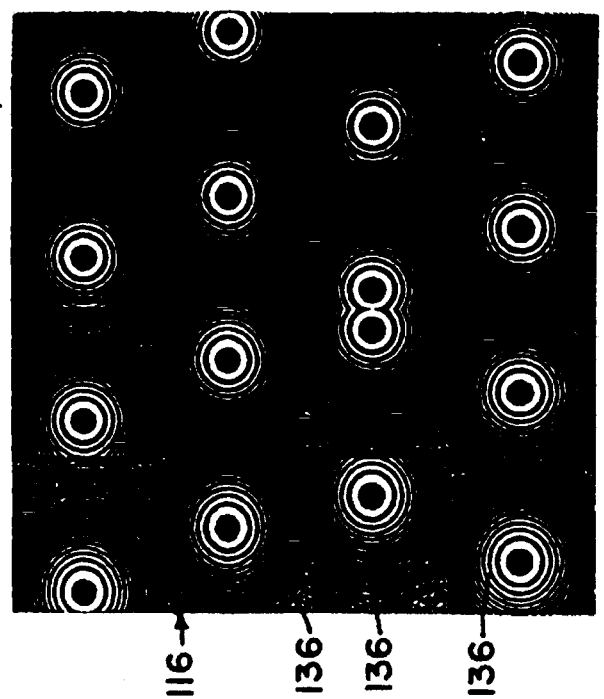
FIG.10b
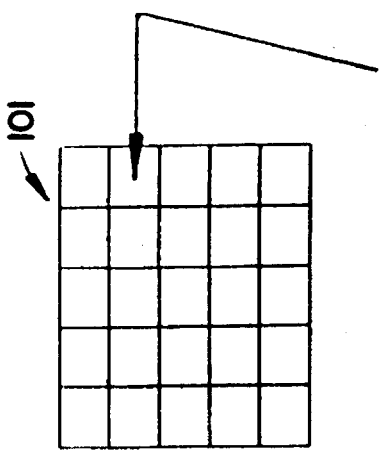
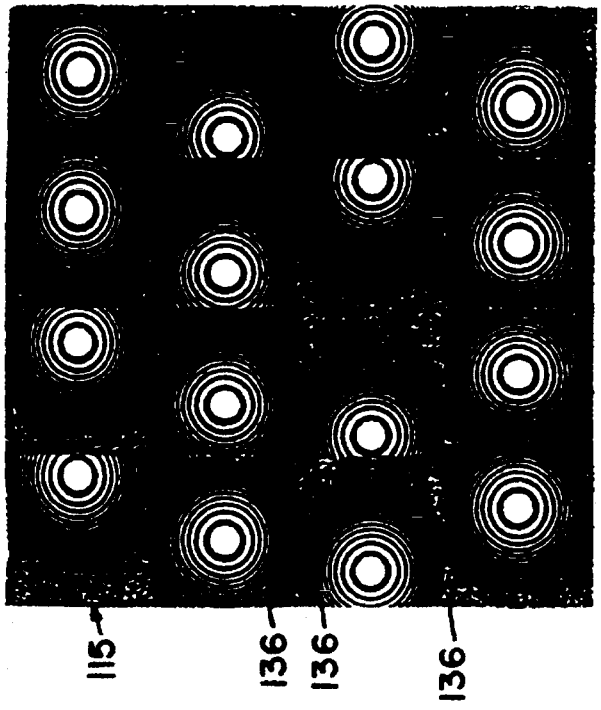
FIG.10a

TWO MASK LEVELS FOUR PHASE

ION ETCHED BINARY PHASE

CHROME ON GLASS BINARY ABSORPTION

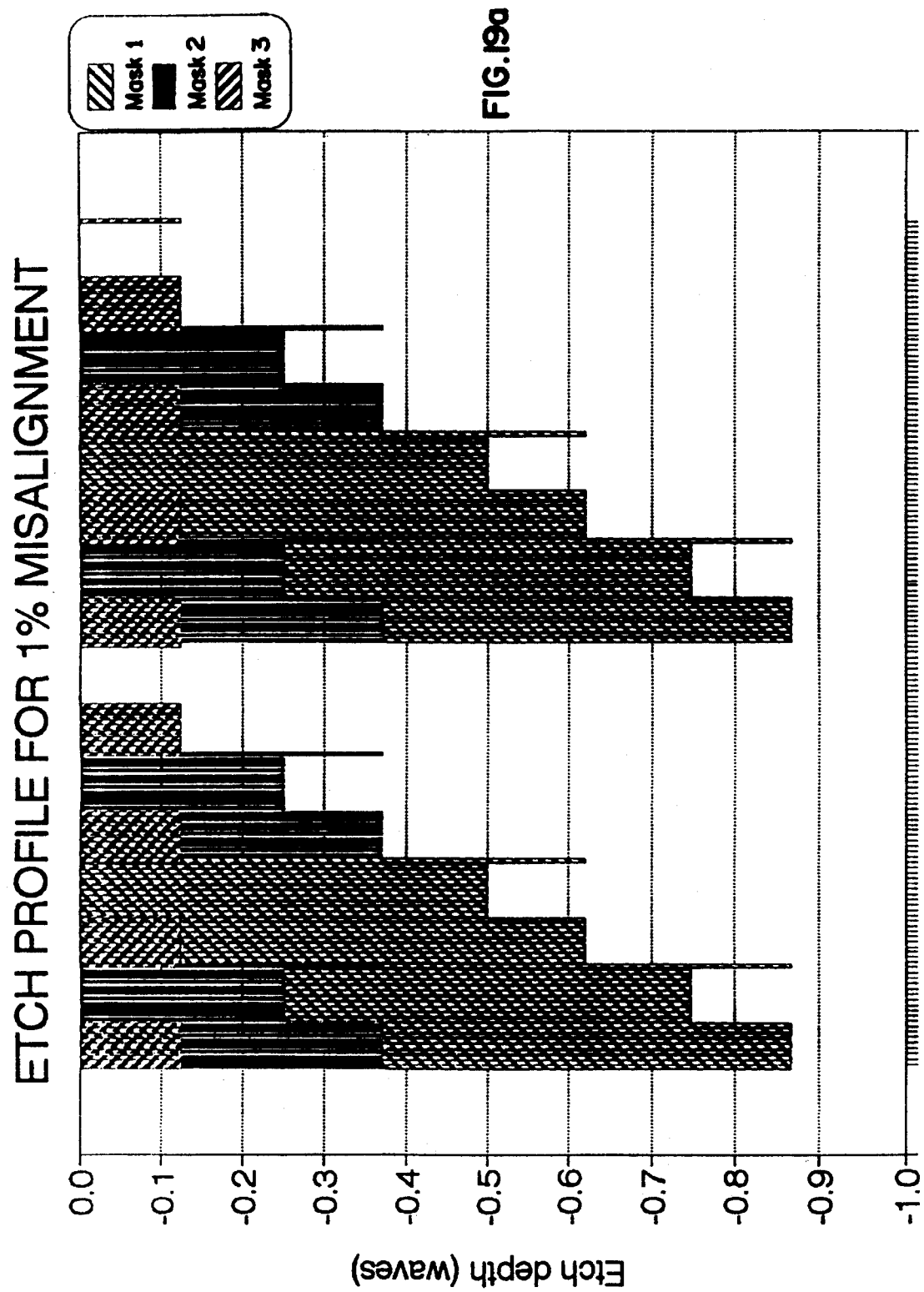

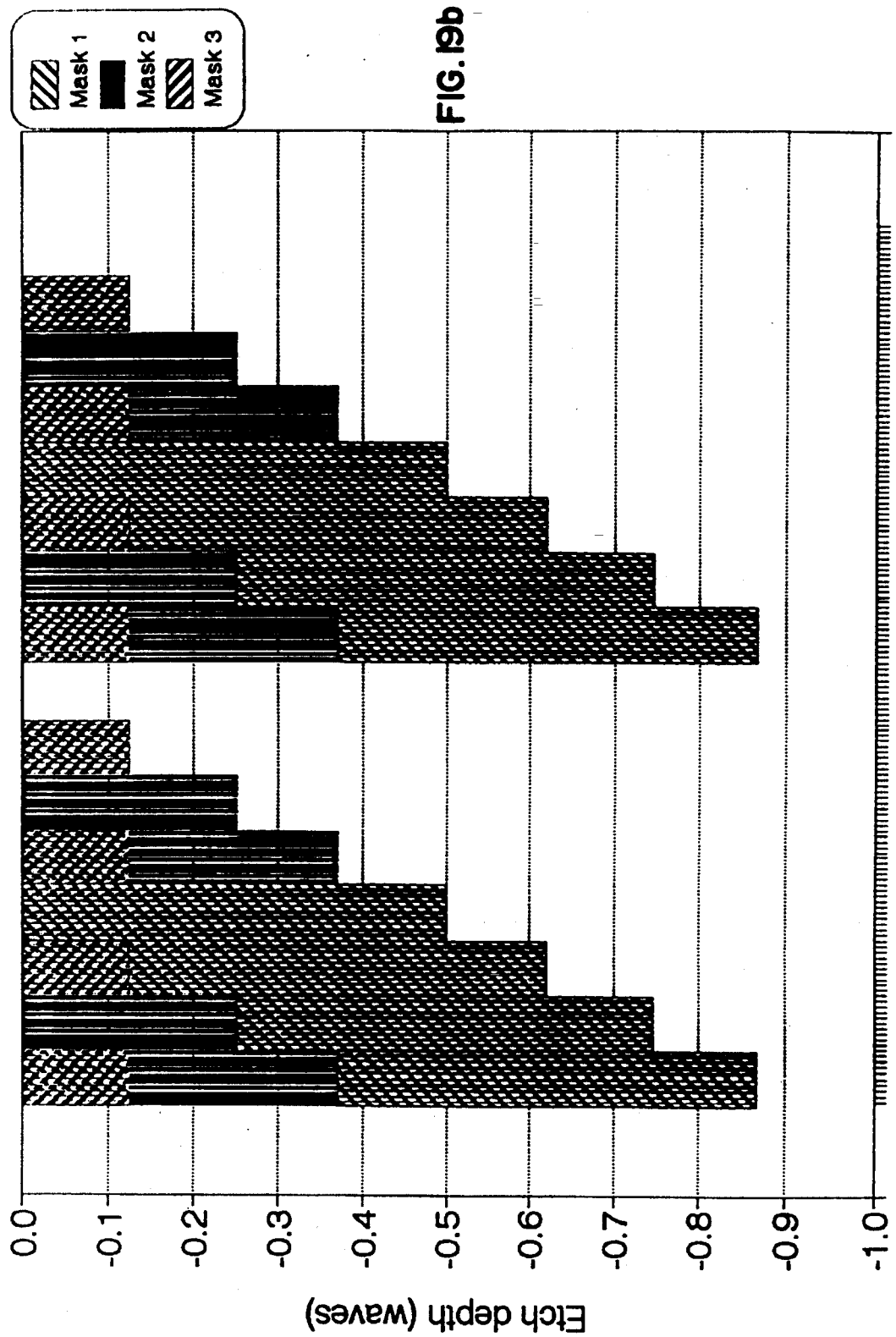

OPTICAL ARRAY METHOD AND APPARATUS

FIELD OF THE INVENTION

This invention relates generally to optical beams, and more particularly to an improved method and apparatus for using optical arrays for dividing a single optical beam into multiple beams, scanning single or multiple beams in one or two dimensions, and collecting the returned scanned beams.

BACKGROUND OF THE INVENTION

Binary Optic Components ("BOCs") are complex diffraction gratings and function based on the particular well known phenomenon of diffraction of light. As those skilled in the art will appreciate, any incoming light beam incident on a complex diffraction grating is diffracted (e.g., see FIG. 4, where diffraction grating 130 diffracts an input beam), with the characteristics of the resulting output beam(s) dependant upon the characteristics of the particular grating. In principle, any desired optical beam distribution can be computer coded and reproduced in terms of diffraction gratings using electron beam write up techniques. Subsequently, these grating patterns can be processed using semiconductor processing technology in order to increase the diffraction grating efficiency. When the resulting processed components are illuminated with light beams, the desired output distribution is obtained. In the past, design and fabrication of BOCs has been used for applications such as testing optical components and generation of complex optical distributions.

Relative to the present invention, the most significant application of BOCs is the fact that several different miniaturized BOCs can be fabricated on a single substrate, with a high degree of accuracy. It has been found that the overall miniaturized BOCs may be fabricated so as to be identical to one another, to differ from one another, or to include groups of differing miniaturized BOCs. The resulting overall component is referred to herein as a miniaturized array element BOC. The present invention includes several methods of utilizing these miniaturized array element BOCs, including splitting, scanning, and/or collecting light beams.

First, a beam splitter is used to divide a light beam into two or more optical beams with identical or differing properties. An input light beam can normally be split into two (2) output beams with the help of a single partially reflecting (or transmitting) mirror or prism (e.g., see FIGS. 5A and 5B). A combination of several of these components can be used to split the input beam into several output beams (e.g., see FIG. 5C). A polarization beam splitter may be used to divide an input beam based on the polarization characteristics. On the other hand, light beams may be split into several beams using a diffraction grating into "different diffraction orders."

Each of the foregoing processes for splitting beams, however, are limited in several ways. For example, these methods are characterized by being complex; being bulky (i.e., requiring several optical elements with optical coatings); having limited control on output beam intensities (i.e., for diffraction orders); and tending to be very expensive. The present invention addresses the problems associated with these devices by utilizing, among other things, an optic array beam splitter ("OABS"), comprised of miniaturized array element BOCs.

Second, a "scanned" beam can be defined as a beam whose direction and/or location is changing over time. Such changes may or may not be repetitious or cyclic. There are several known ways for scanning a light beam. The most simple technique consists of a simple motorized or mechanized rotating mirror. In this example, an input light beam reflected off of the rotating mirror would exit in a different direction, based on the orientation of the rotating mirror at a particular time. There are several other techniques and components which may be used for scanning. Some of the techniques consist of: acousto-optic or electro-optic Bragg diffraction gratings, while some of the commonly used components used for scanning are: prisms, and holographic optical elements. However, these techniques each suffer from drawbacks. For example, Bragg diffraction gratings based scanners are, in general, limited to one-dimensional scanning, are less efficient, and are expensive. Other commonly used scanners such as prisms, mirrors and holograms are bulky and require precise, expensive motors. Furthermore, a single mirror or prism is limited to one dimensional scanning.

The present invention addresses the foregoing drawbacks associated with the prior art by utilizing, among other things, an optical array sensor transmitter ("OAST") comprised of miniaturized array element BOCs. Although the scanning of a single light beam using BOC arrays in one dimension has been reported in the literature (e.g., William Goltas and Michael Holz, SPIE Vol. 1052, 131–41 1989), the present invention utilizes the process of using an array of optical components such as BOCs, to scan: i) multiple beams in one and/or two dimensions, and ii) a single beam in two dimensions.

Third, many devices such as RADARs and bar code readers, illuminate or intercept targets of mutual interest (i.e., an aircraft or a bar code) with "scanned" radio waves or laser beams, and collect the subsequent reflected or scattered waves or beams ("return beams") to determine the characteristics of the target of interest. These return beams are generally collected in one of two manners.

The first manner is a stationary/non-scanning receiver. The return beams of this first type are normally collected using a large aperture system and focused on a one-dimensional or two-dimensional detector array, depending upon a one dimensional or two dimensional transmitted scan beam. Use of this method requires that each element of the detector array corresponds to a different direction of the transmitted scanned beam. Thus, the main disadvantage of this approach is that it requires a large array of detector elements to capture several directions of the transmitted beam. Furthermore, the receiver is generally suitable for one transmitted scan beam only.

The second manner is a scanning receiver. Here the receiver scans in-sync with the transmission scanning, and normally shares the scanning components with the transmitted beam. As a result, the return beam encounters "positive" (while being transmitted) and "negative" (during return path) scan, resulting in a null scan, and hence the location of return beam is independent of the scanning.

There are two major disadvantages of this approach. First, since the aperture of the receiving optics is normally significantly larger than the transmitter, the null scan option requires that the size of the transmission optics (including the scanning components) be very large, resulting in heavy and costly systems. Second, for multiple beam scans the return beam encounters both the compensating negative scan and compensating de-splitting. Thus, the beam is recombined into a single beam, resulting in only a single return beam. This is undesirable, since multiple beam information in the receiver mode is needed. Therefore, in an optimum system for these applications, compensation (or the negative scan) should be accomplished without sharing the transmitter and receiver apertures, and the receiver beam (or the return beam) should not encounter the de-splitting device or be recombined into a single beam.

Therefore, there arises a need for an optical array constructed which can split, scan and collect a beam of light, either collectively or individually. Additionally, the optical array should preferably be constructed of elements which can be fabricated in a single device. By doing so, the device may be constructed robustly and at great efficiencies. Further, the calibrating and adjusting of such a system is greatly reduced. The present invention directly addresses and overcomes the shortcomings of the prior art.

SUMMARY OF THE INVENTION

The present invention provides an improved optic array beam splitter in order to split in an angular manner an input beam into multiple beams, traveling in different directions. The OABS utilizes miniaturized array element BOCs arranged in "n" different groups, wherein n is dependent upon the number of split beams needed or desired. An offset is introduced between the optical axis of each of the corresponding pair of miniaturized BOCs. As used herein "offset" shall refer to the relative shift, both magnitude and direction, between the optical axis of the two optical elements of each BOC corresponding pair.

In a second preferred embodiment of a device constructed according to the principles of this invention, the device includes two or more arrays of miniaturized binary optic components (BOC arrays), wherein the second BOC array includes an offset from the first. By then varying the offset over time, the resultant beam(s) can be scanned in one, two or three dimensions. One example of a device which can introduce the movement to the second BOC array is a piezo-electric driver controlled by a processor in order to move in a predetermined manner. According to a third preferred embodiment of a device constructed according to the principles of the present invention, the device includes two or more BOC arrays having an offset from one another, a device to introduce movement to at least one of the BOC arrays relative to the other, and a detector for receiving the returned beams. The returned beams are collected by an array of optic components integrated with the scanner and focused onto detectors (preferably one for each scanned beam).

Therefore, one feature of the present invention is that the problem of multiple beam splitting, and splitting an input beam into several beams, is simplified into a single discrete assembly comprised of two separate array components which are easily fabricated. A second feature is that the resultant beams may be scanned in a programmable manner in one or two dimensions. A third feature is that the transmitted beams may be collected with optical arrays of optical components which are located on the same component as the transmitter arrays which are easily fabricated.

Therefore, according to one aspect of the invention, there is provided an apparatus for splitting a beam of light into a plurality of output beams, comprising: a) a first miniaturized array of at least one binary optical component; and b) a second miniaturized array of at least one binary optical component, wherein each of said components on said second array maps into one of said components on said first array, whereby sets of corresponding components on said first and second array are defined, and wherein at least one of said binary optical components is offset, and wherein the beam of light is split into two or more output beams. There is also provided a method of splitting a beam of light into a plurality of output beams comprising the steps of: a) directing a beam of light onto a first binary optic component; b) directing the resulting beam from said first binary optical component onto a second binary optical component; and c) introducing an offset between said first and second binary optical components, wherein a plurality of output beams were created.

These and other advantages and features which characterize the present invention are pointed out with particularity in the claims annexed hereto and forming a further part hereof. However, for a better understanding of the invention, its advantages and objects attained by its use, reference should be made to the Drawing which forms a further part hereof, and to the accompanying descriptive matter, in which there is illustrated and described preferred embodiments of the present invention.

BRIEF DESCRIPTION OF THE DRAWING

In the Drawing, wherein like reference numerals and letters indicate corresponding elements throughout the several views:

FIG. 5A is a diagrammatic illustration of beam splitting using partially reflecting mirrors;

FIG. 5B is a diagrammatic illustration of beam splitting using prisms;

FIG. 5C is a diagrammatic illustration of multiple beam splitter using a combination of mirrors and prisms;

FIG. 8 schematically illustrates a binary array representing a Galilean telescope with finite offsets;

FIG. 10 diagrammatically illustrates two binary arrays used to implement the present OABS;

FIGS. 19A–19B illustrate an example etch profile for one degree misalignment and perfect alignment respectively.

DETAILED DESCRIPTION OF THE PREFERRED EMBODIMENT

The principles of this invention apply to the dividing of an input light beam into several output beams traveling in different directions; scanning the beams in single or multiple light beams (either generated as divided by the principles of this invention or by another means) in one or two dimensions by translating arrays of optical elements such as binary optic components with respect to each other; and/or including collecting the returns of a predetermined number of optic array scanner transmitter beams through an array of optic components integrated with the scanner and focusing onto a predetermined number of detectors (i.e., one detector for each of the scanned beams). A preferred application for this invention is a laser based RADAR (e.g., LADAR) in which: (i) division of a single beam into multiple beams; (ii) two-dimensional scan of multiple beams; and (iii) collection of the return beams can be accomplished. Scanning characteristics utilizing the principles of the present invention can also be adapted to many other applications such as laser printing. However, those skilled in the art will appreciate that such applications are typical of only two of the innumerable types of applications in which the principles of the present invention can be employed.

Referring now to the Figs., there is illustrated preferred embodiments of dividing, scanning, and collecting devices configured in accordance with the principles of the present invention. Each of these devices and the corresponding embodiments will be described in detail in order below. For the purposes of clarity, however, a discussion of a preferred fabrication technique of the BOCs will be deferred subsequent to the last embodiment.

Optic Array Beam Splitter (OABS)

First to be presented is the description of the process of dividing (splitting) an input light beam into several output beams using optical array components. The present approach can be described by an array of miniaturized Galilean telescopes (e.g., see FIG. 6A), arranged in "n" different groups (n=1, 2, 3, etc., depending upon the number of split beams needed or desired). Each group is characterized with a different amount of "offset" as shown in FIG. 6B (as also noted above, as used herein "offset" refers to the relative shift, both magnitude and direction, between the optical axis of the two optical elements of the device being considered).

Figure 6A:
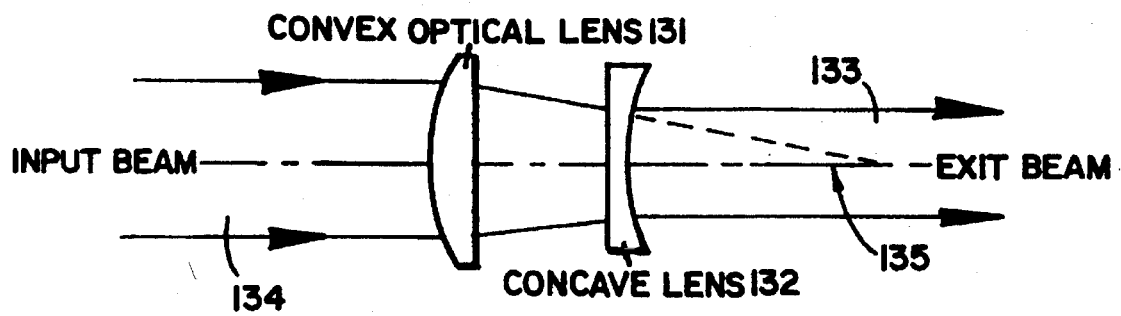
FIG. 6A is a diagrammatic illustration of a Galilean telescope with a zero degree offset.
Figure 6B:
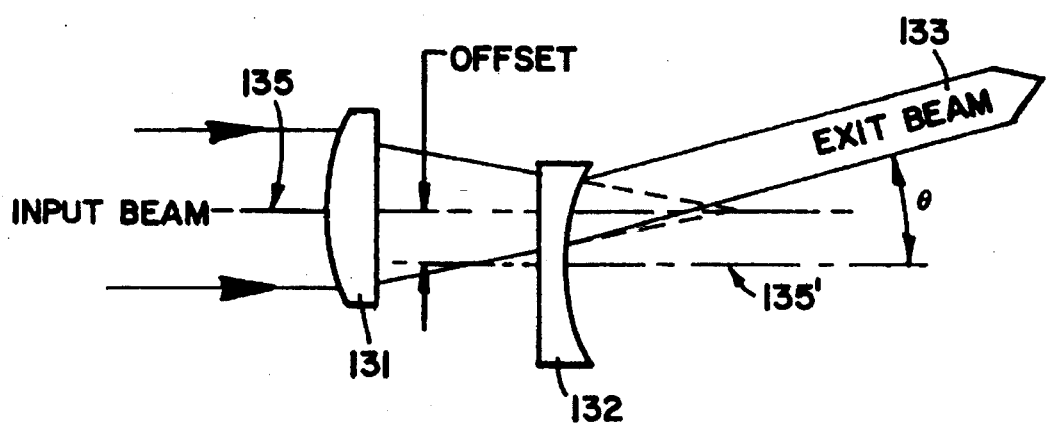
FIG. 6B is a diagrammatic illustration of a Galilean telescope with a zero degree offset and further illustrating the exit beam traveling at an angle beta depending upon the offset amount.

Referring to FIG. 6A, a basic Galilean telescope consisting of two conventional optical elements 131, 132 (a convex or positive lens 131, and a concave or negative lens 132) is illustrated. As will be appreciated by those skilled in the art, when a light beam 134 traveling parallel to the optical axis hits the first lens 131 (convex), it directs the beam toward its focal point on the optical axis. The second lens 132 (concave) is located in a way that it recollimates the beam (i.e., the exit beam 133 travels as a beam of nearly uniform diameter). Thus, the direction of the beam depends upon the "offset" of the second lens with respect to the first lens. If the "offset" is zero (as shown in FIG. 6A), then the two lenses are located along the same axis 135 and the beam 133 continues in its original direction (prior to the first lens 131). However, if the "offset" is non-zero (i.e., the optical axis 135' is not along the same axis 135), then the exit beam 133 travels in a direction other than the input beam 134. The magnitude and direction of the angular shift depends upon the amount and orientation of the "offset," as is illustrated in FIG. 6B.

Figure 7A:
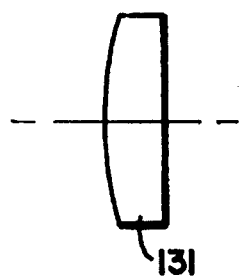
FIG. 7A is an illustration of a conventional lens.
Figure 7B:
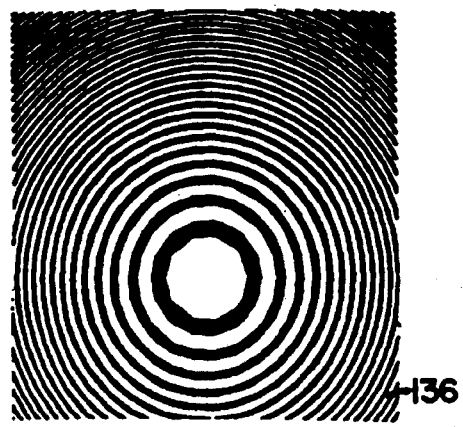
FIG. 7B is an illustration of a binary lens.
Figure 7C:
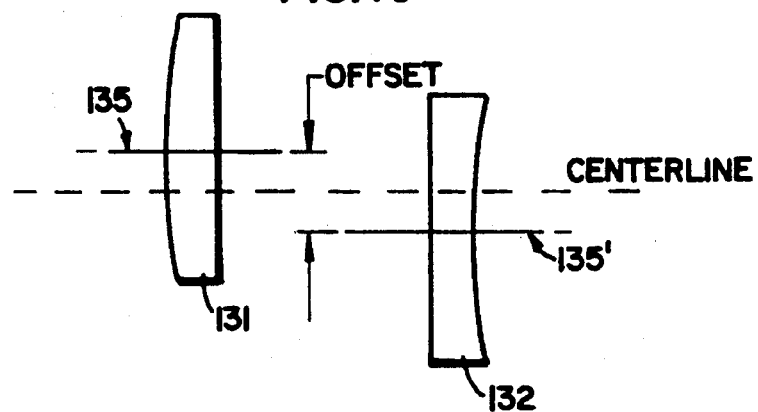
FIG. 7C is a diagrammatic illustration of a Galilean telescope with offset.
Figure 7D:
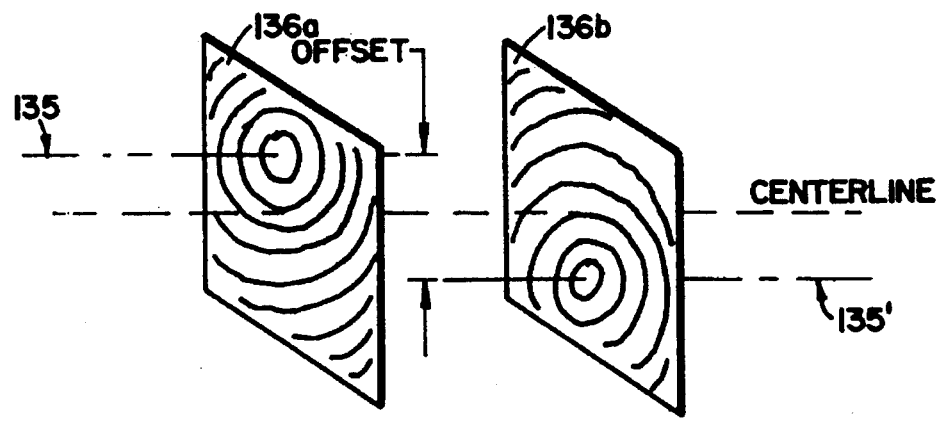
FIG. 7D is a schematic illustration of a binary component Galilean optic with offset.

Using this characteristic, an array of miniaturized Galilean telescopes with "n" different sets of "offsets" will result in dividing an input beam into "n" different output beams traveling in different directions. FIGS. 7A and 7B schematically illustrate a conventional lens 131 and a binary optic lens 136, respectively, while FIGS. 7C and 7D schematically illustrate conventional optics and BOC Galilean telescopes for different offsets.

Figure 9:
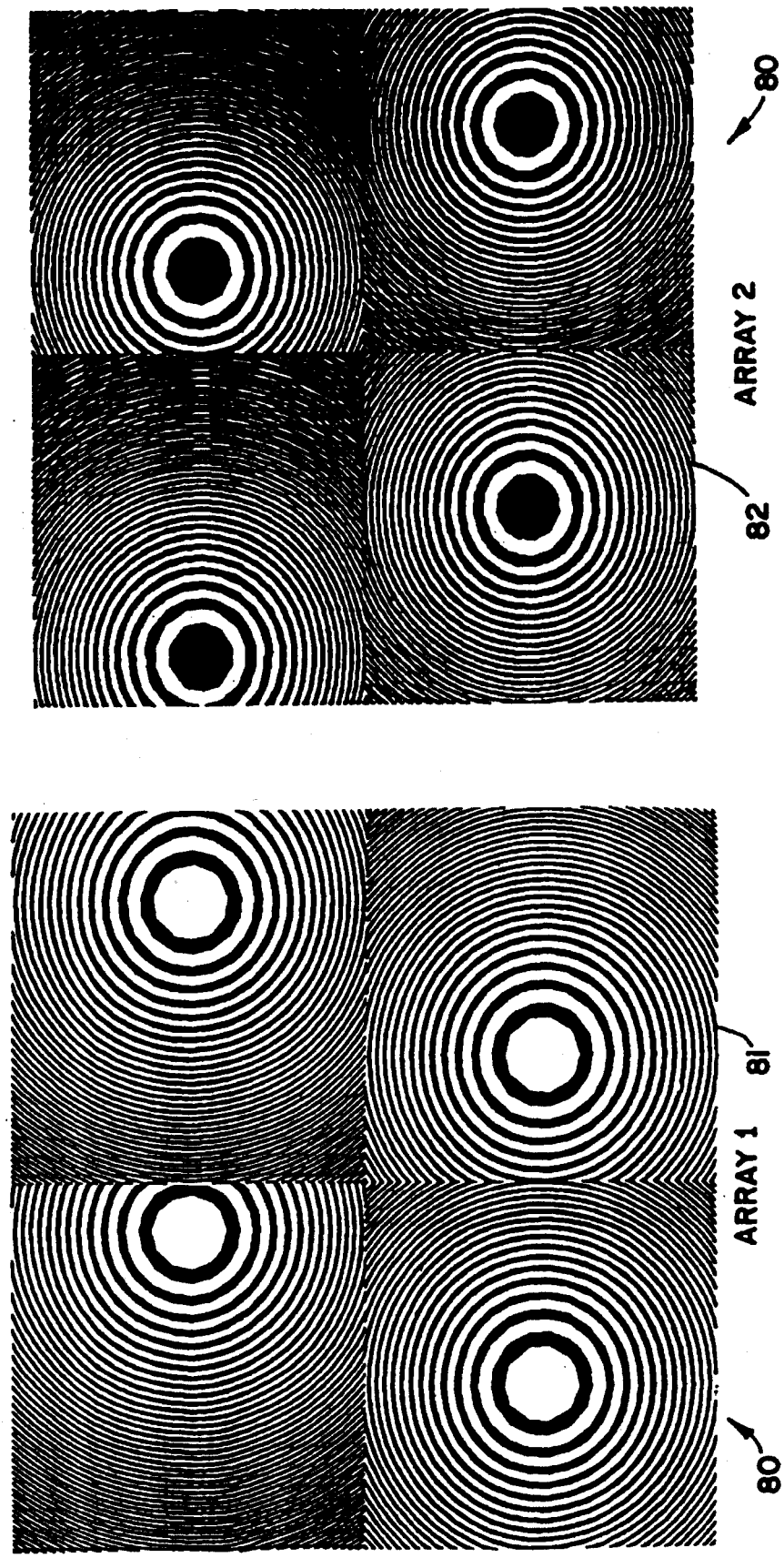
FIG. 9 is a cross-section of the two elements of a binary array Galilean telescope with offsets.

From the foregoing, an array of BOC Galilean telescopes with "n" different "offsets" can be defined which will divide an input beam into "n" different output beams, traveling in different directions. Referring to FIG. 8 the schematics of a binary array 80 (using two arrays—array 81 and array 82) beam splitter 119 are illustrated. FIG. 9 illustrates schematically the representative cross-sections of array 81 and 82.

Example of a Preferred Embodiment OABS

Figure 1:
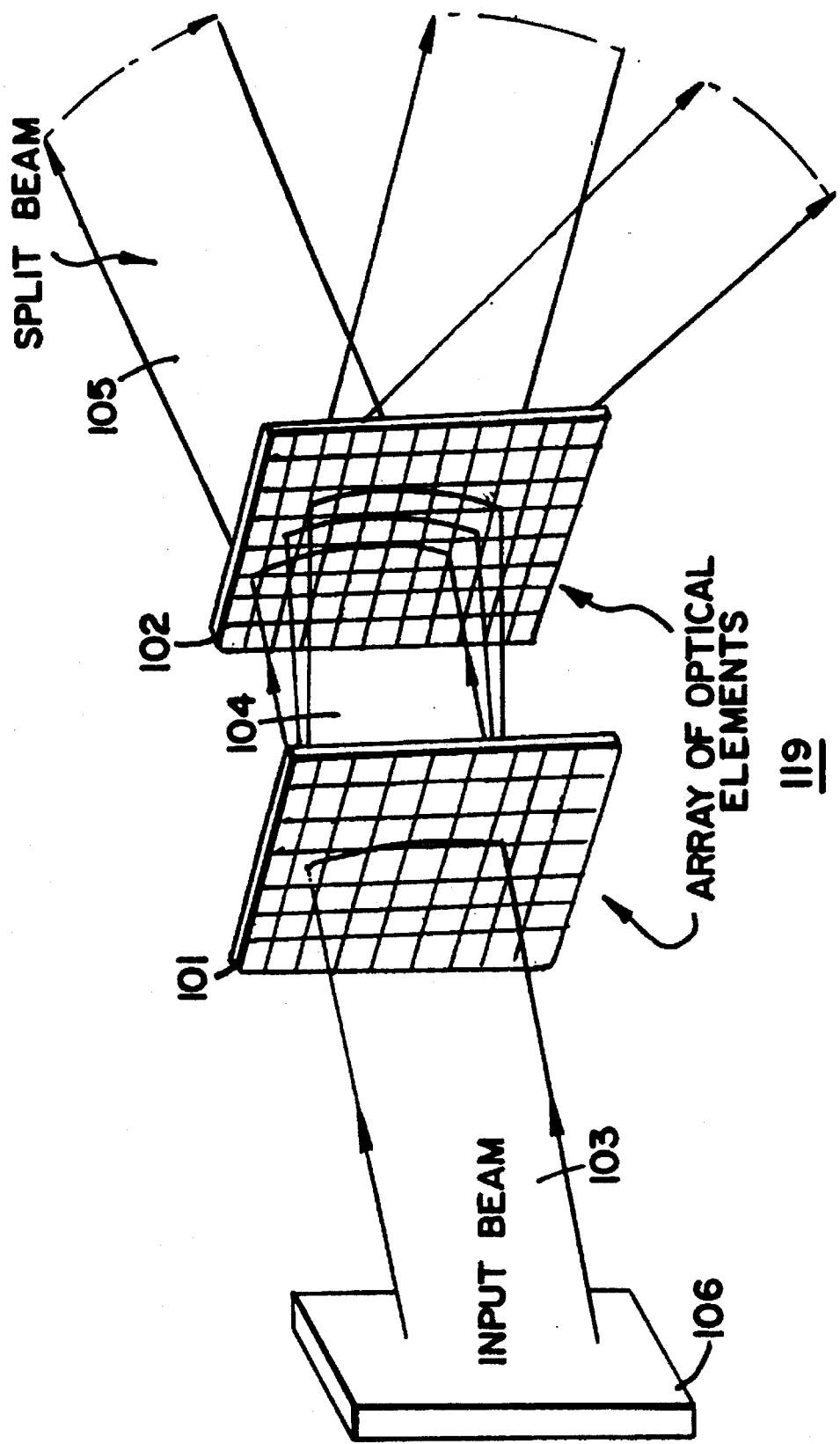
FIG. 1 is a schematic representation of a first and second array of optical elements which split an input beam into several output beams in accordance with the principles of the present invention.

This section discusses a preferred splitter embodiment 119 which was constructed in accordance with the principles of the present invention. In general, the arrays of binary optic elements 101, 102 are utilized to angularly split an input beam 103 into multiple beams 105, traveling in different directions. One example of such a device is illustrated in FIG. 1 and may be accomplished in accordance with the following. However, those skilled in the art will appreciate that other combinations may be constructed and so the invention should not be limited by the following example which uses n=8.

Referring to FIG. 10 the schematics of two example BOC arrays 101 and 102 (12 mm×12 mm each), representing the two optical elements of a "Galilean telescope" are shown. Each is divided into an array of 5×5 identical elements (total of 25 elements) to start with, and then each of these 25 elements is subdivided into an array of 4×4 sub-elements 115, 116, resulting in 400 sub-elements. The sixteen (16) sub-elements, in any of the 25 elements, consist of two identical elements for eight (8) different "offsets" corresponding to the desired eight (8) output beams. The overall array, therefore, consists of 50 elements for a particular "offset," distributed over the 12 mm×12 mm BOC, and the 400 elements represent eight (8) different "offsets." The relative positioning of these different elements in any one array 101, 102 (corresponding to one optical component of the Galilean telescope) is not critical. However, the two arrays 101, 102 are designed in a way that, when the two arrays are aligned with respect to each other, the positioning of the small elements is such that there is a one-to-one relation between the two array elements (i.e., individual BOCs 136 are matched between arrays 101, 102) so as to form the desired Galilean telescopes. In other words, pairing of suitable elements is required.

Note that elements of one of these arrays could be made identical, and only the other array could have "n" different elements, but with same overall "offsets," with identical results. The only difference would be that one of the two arrays then would carry the burden of beam splitting rather than sharing.

The number of paired elements and the locations of the elements tends to mix the input light 103 to form the eight beams 105. Therefore, a mixing of the various laser beam densities occurs. As those skilled in the art will appreciate, density is not uniform center to edge in a laser. Therefore, preferably this mixing occurs to provide an even density.

Figure 11:
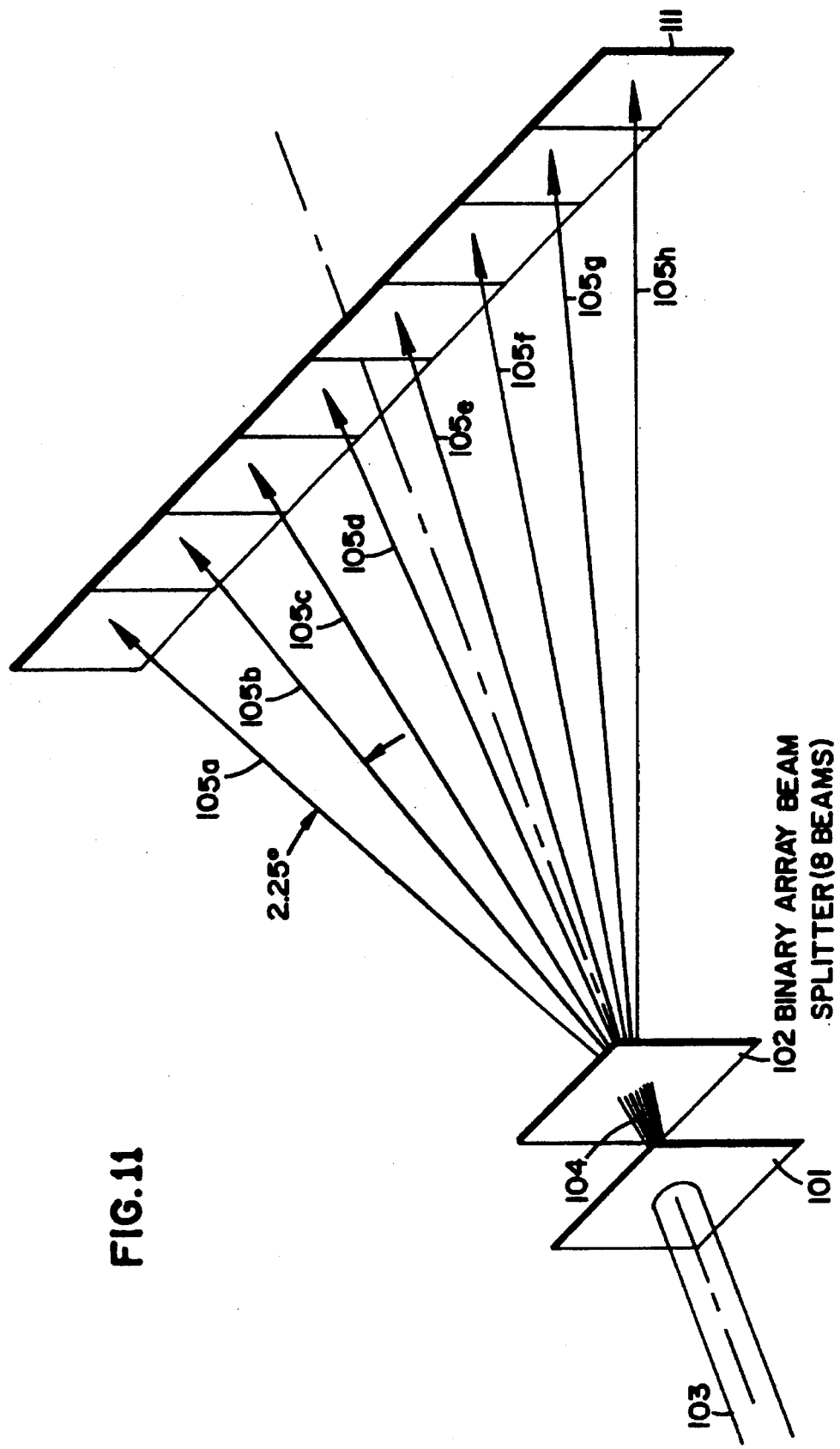
FIG. 11 illustrates an eight-beam binary array beam splitter constructed in accordance with the principles of the present invention.

The two arrays 101, 102 were processed using three (3) mask-levels to increase their diffraction efficiencies, as discussed below in the Fabrication section. The overall design and processing was performed for a particular laser beam (characterized by its wavelength—1.06 micrometer). The eight beams 105 were designed to exit at an angle of 2.25 degrees with respect to each other, in a particular plane 111, as shown in FIG. 11.

Light beam 103 strikes first array 101 on a first side and each first array 101 element diffracts and focuses the light. The resultant light beams 104 exit the second side of the first array 101 and strike the first side of the second array 102. Due to the offset of each corresponding element of the second array 102 mapped into the first array 101, the resultant beams 104 are recombined into eight (8) beams 105a–105h.

Subsequent to fabrication and processing, the two BOC arrays 101 and 102 were held parallel to each other with a predetermined spacing, and properly aligned to "pair" the corresponding array elements using a mechanical mount. The assembly of the two BOC arrays 101 and 102 was illuminated with the 1.06 micrometer collimated laser beam generated in a known manner by block 106 (best seen in FIG. 1). The output of the assembly showed eight (8) exit beams 105a–105h with an approximate 2.25 degree separation with respect to each other.

Those skilled in the art may appreciate that it may be possible to mount the two arrays 101 and 102 into a single assembly either by mechanical mounts or by cementing; that it may also be possible to subdivide the two arrays 1 and 2 into more than two arrays (i.e., for either simplifying the design and fabrication of the arrays and/or cascading the exit beams to resulting in additional beams or recombination of the beams); that it may also be possible to change the direction of the angular beams into several exit beams traveling in same directions using convention and/or binary elements, and that it may also be possible to select "m" differing elements on each of the two arrays 101 and 102 to result in "n" exit beams (i.e., m not equal to n). However, the preferred embodiment splitter 100 example used herein deals with the process of subdividing the input beams using several differing optic array elements and "pairing" these elements to obtain "n" output beams traveling in different directions.

Optical Array Scanner Transmitter (OAST)

Figure 2:
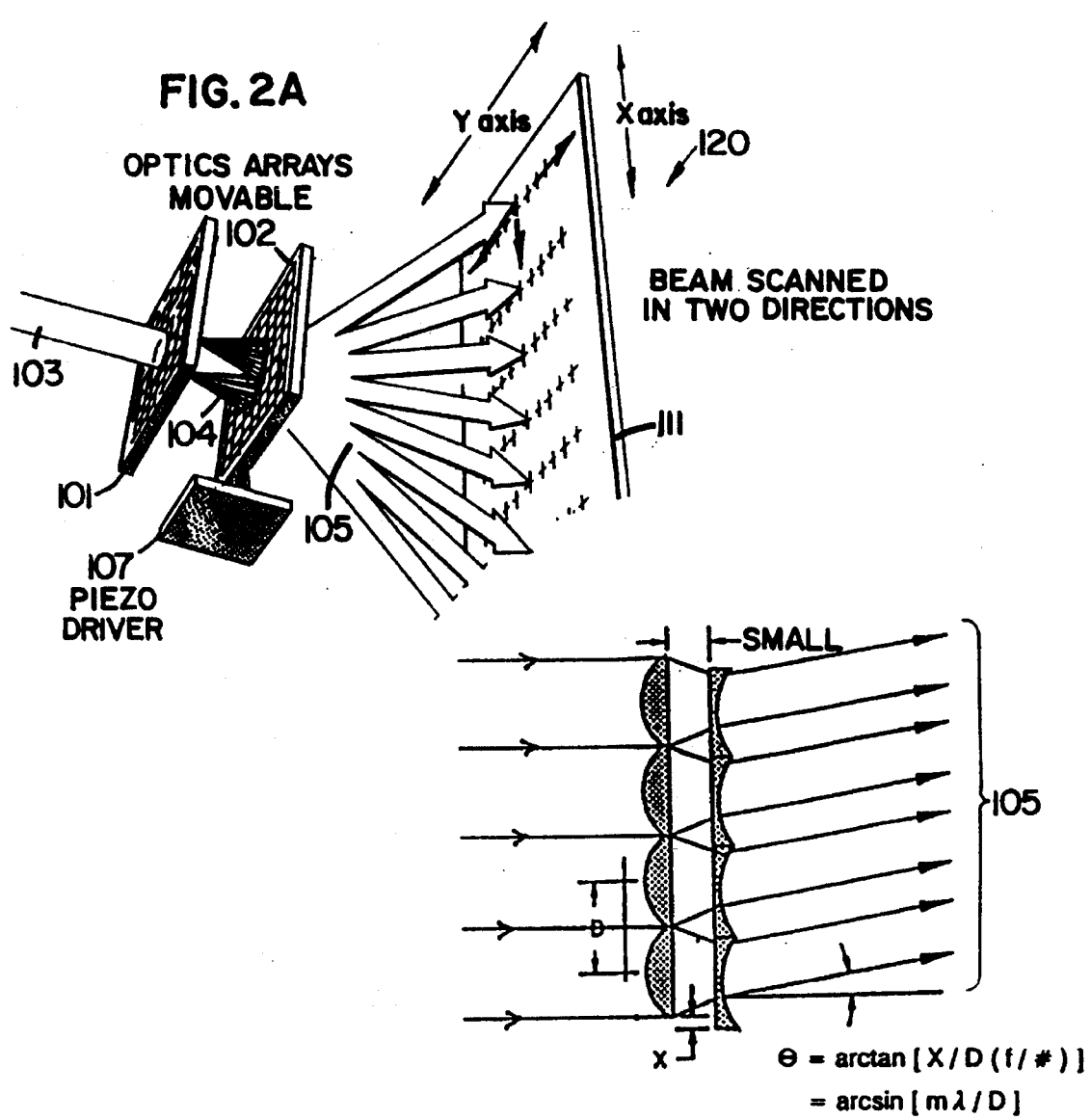
FIG. 2A is a schematic representation of a multiple beam scanner using optical array elements in two dimensions.
FIG. 2B is an enlarged cross-sectional view taken from FIG. 2A.

As will next be described, the present invention also includes the process of scanning a single (or multiple light beam(s)) in one or two dimensions by translating the optical arrays 101 and 102 with respect to each other. For convenience this will be referred to herein as an Optic Array Scanner Transmitter ("OAST") 120. FIG. 2 schematically represents an OAST 120.

A "scanned" beam can be defined as a beam whose direction and/or location is changing in time. Such changes may or may not be repetitious or cyclic. There are several ways in which a light beam may be scanned which are discussed above. The present invention, however, includes the process of utilizing an array of miniaturized optical elements such as BOCs, to accomplish one or two dimensional scanning of a single or multiple light beam.

The basic concept of the array scanning can be explained, once again, by considering the Galilean telescope with a non-zero offset. As mentioned before, the input and output beam from a Galilean telescope travel in different directions for a non-zero offset. If one of the two optical elements of the telescope is shifted with respect to the other one in real time, it would, in turn, result in real time shift or change in the direction of the exit beam with respect to the input beam. If this offset is mechanized to follow a particular shift pattern, the direction and/or location of the output beam would therefore change resulting in a scanned beam. If the direction of the "scanned" beam is confined into one plane, it is referred to as a "one-dimensional scan." On the other hand, if the direction of the "scanned" beam is not confined to one plane but in two planes, then it is referred to as a "two-dimensional scan."

Figure 12:
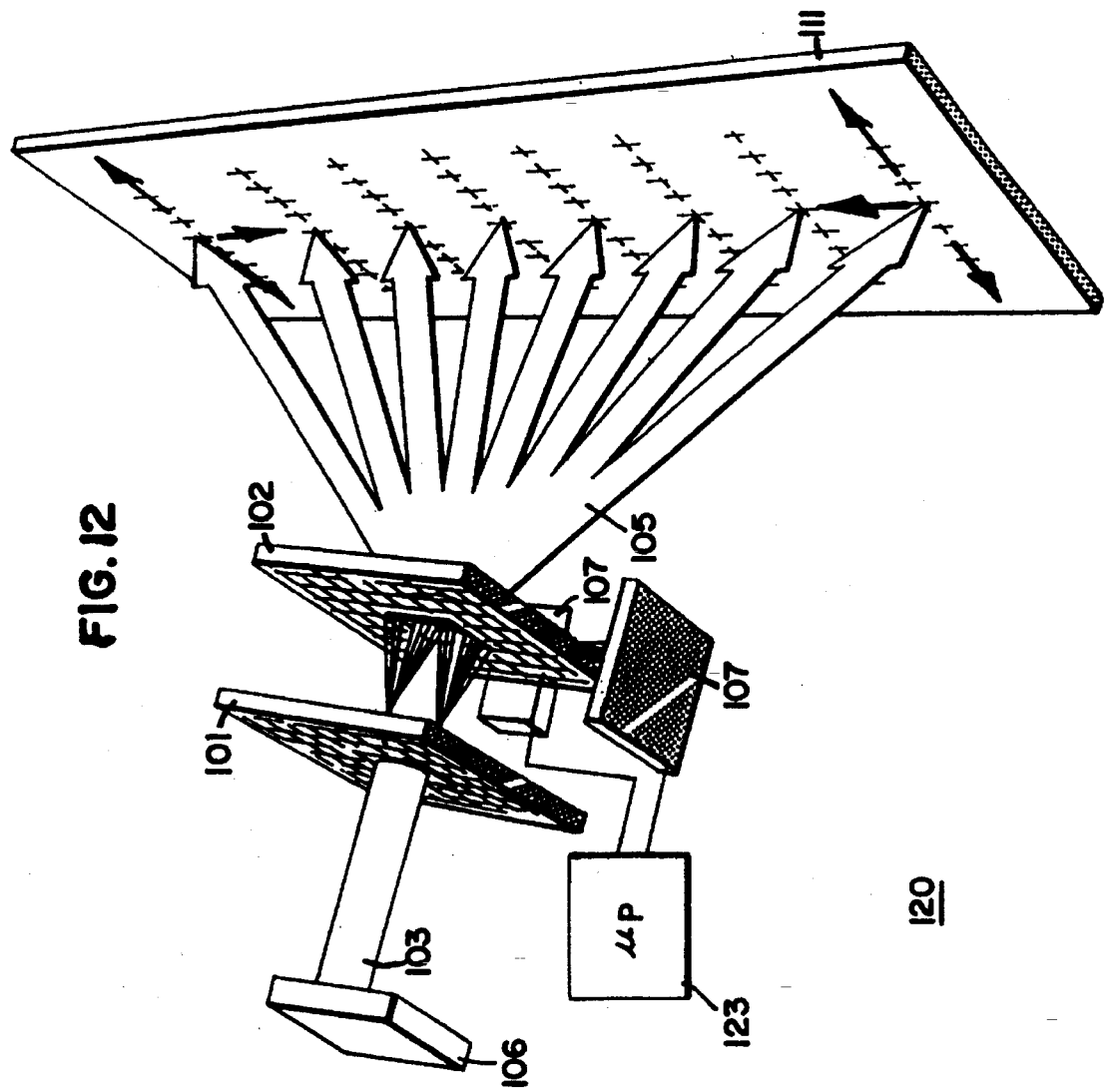
FIG. 12 diagrammatically illustrates the schematics of an OAST.

FIG. 12 illustrates an OAST 120 utilizing optical arrays (such as the first and second BOC arrays 101 and 102 discussed above) resulting in a two dimensional scan of multiple beams 105. The two dimensional scan is indicated in an X-Y plane 111. Note also that the FIG. 12 is representative of the OABS 109 discussed above as well, in which an input beam 103 is divided into multiple beams 105, which are subsequently scanned in two dimensions.

Example of a Preferred Embodiment OAST

An example OAST scanner may be constructed according to the principles of the present invention by utilizing the two arrays of binary components, and the mounting hardware fabricated while constructing the OABS splitter 119 as described above. The shifting of the second array with respect to first may be accomplished using Piezo drives 107, located within the mounting hardware (not shown). An example of drives which may be used are manufactured by Dr. Lutz Pickelmann Piezomechanik-Optik of Munich, Germany, having the model designation PST 150/7/75. As those skilled in the art will appreciate, a total of 2 drives are required to scan in two dimensions (i.e., one for each axis of scanning capability).

In the preferred embodiment grooves are cut in the interior of two metal frames. The arrays 101, 102 are then placed in the frame. The drives 107 are also cooperatively mounted within the groove such that everything is in one plane. The grooves are sized and configured to allow the arrays to slide in the groove when acted on by the drives. A microprocessor 123 is used to actuate the drives 107 in a known manner.

Figure 13:
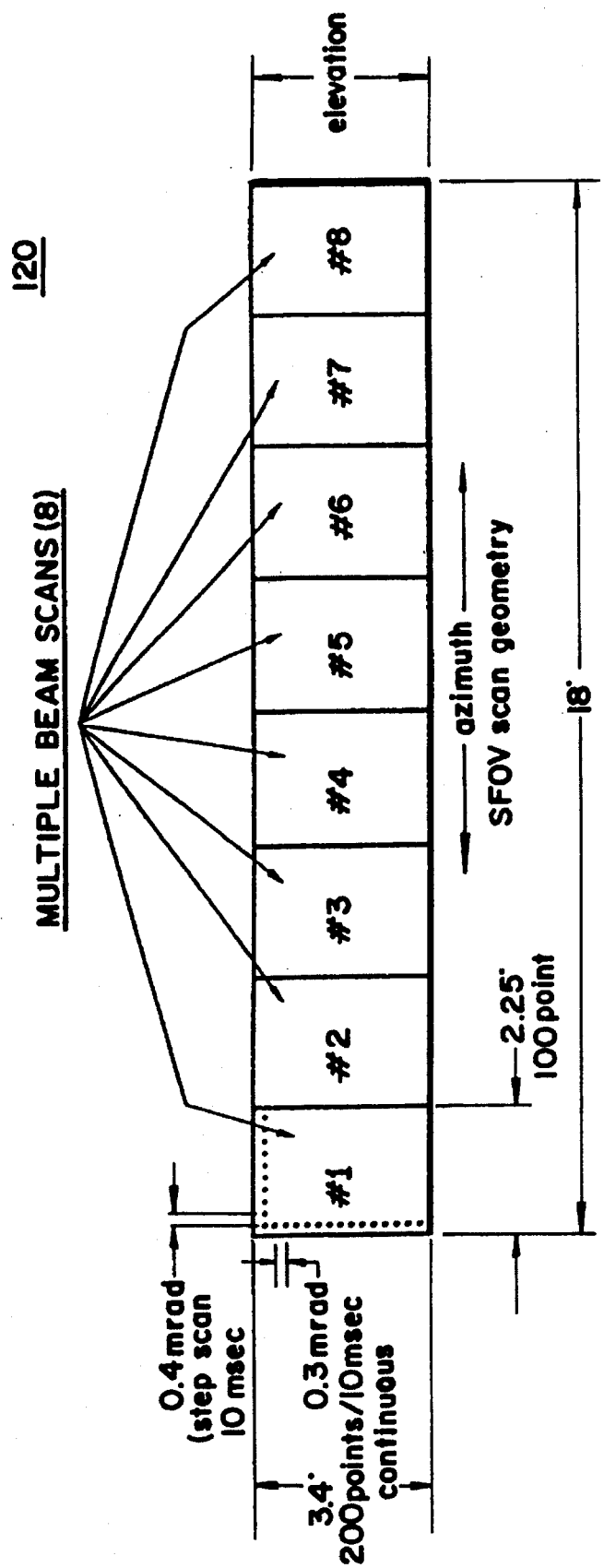
FIG. 13 diagrammatically illustrates the schematics of a two-dimensional, eight-beam scan device constructed according to the principles of the present invention.

Referring to FIG. 13, in the preferred example, the example hardware was designed and tested to accomplish the following:

Overall scan angle along the beam split direction (azimuth): + and −1.125 degrees Overall scan angle along the orthogonal direction: + and −1.7 degrees Optical Array Scanning Transmitter-Receiver (OAST-R)

Figure 3:
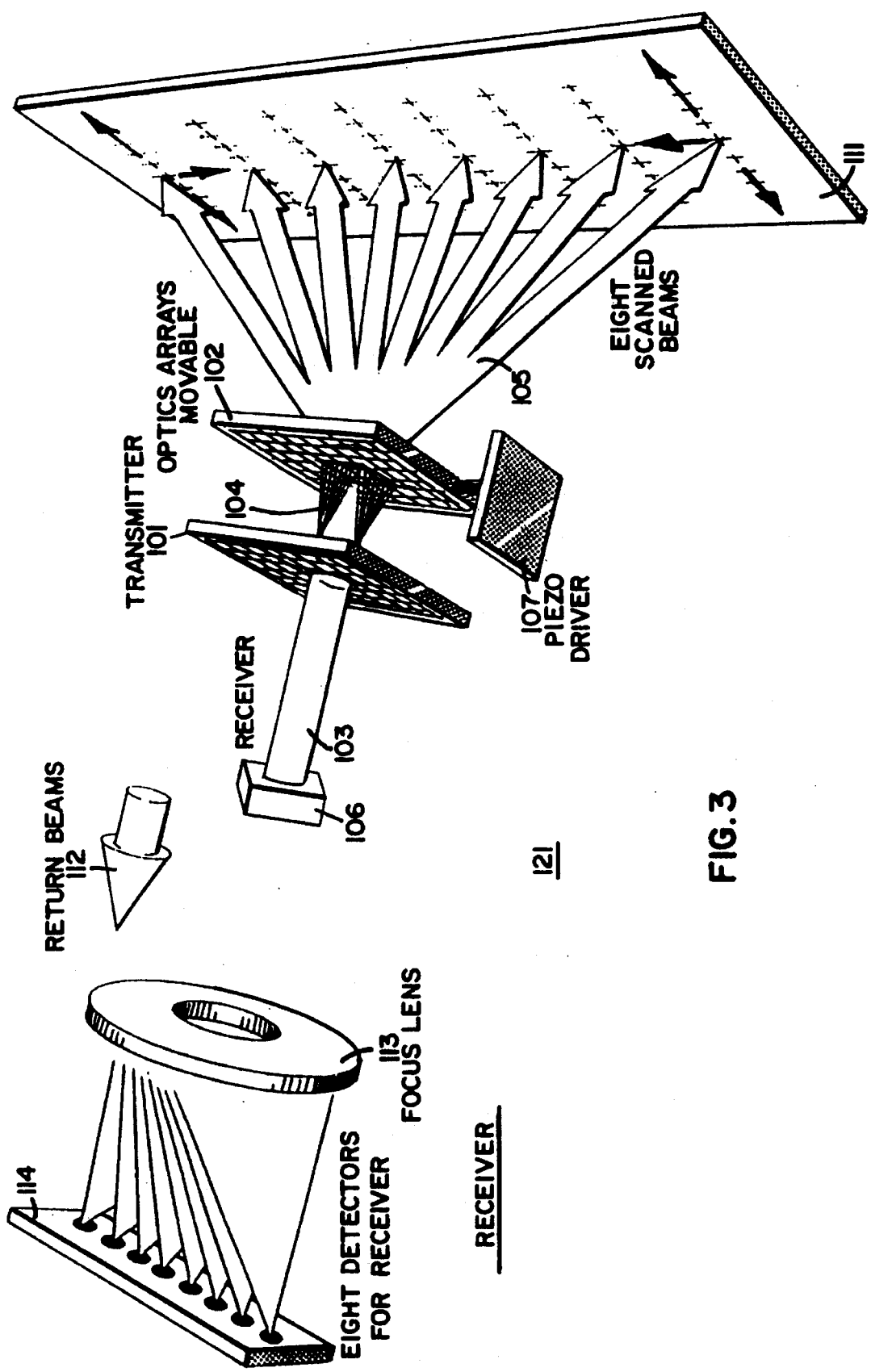
FIG. 3 is a schematic representation of an optical array receiver for a multiple beam scanner.
Figure 4:
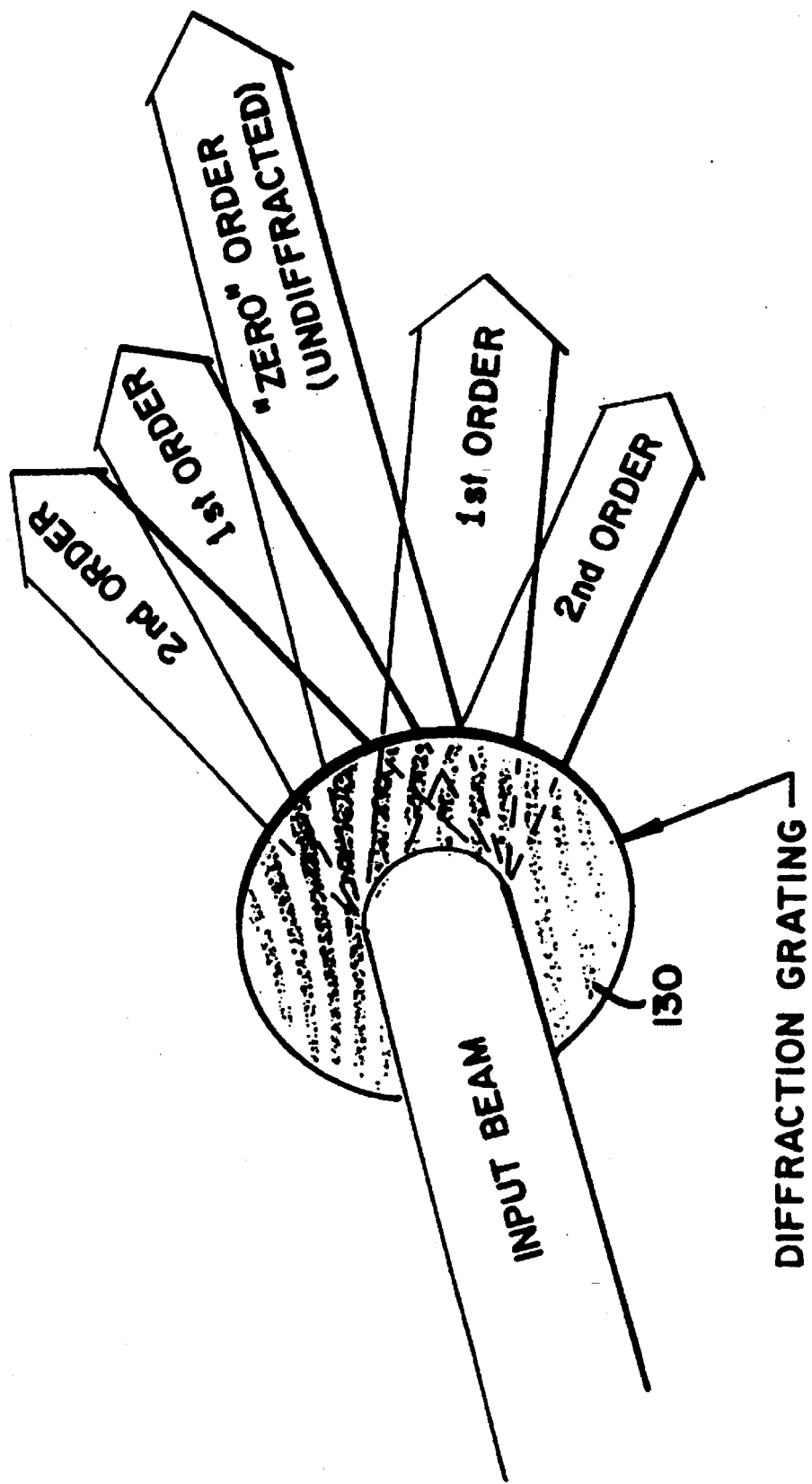
FIG. 4 is a schematic representation of a complex diffraction grating and diffracted orders.

The present invention also may include using the process of collecting the returns of OAST beams on an array of optical detectors by an array of optical elements such as BOCs. An example of an optical array scanning transmitter-receiver (OAST-R) 121 is shown in FIG. 3. This aspect of the present invention will next be described.

Figure 14A:
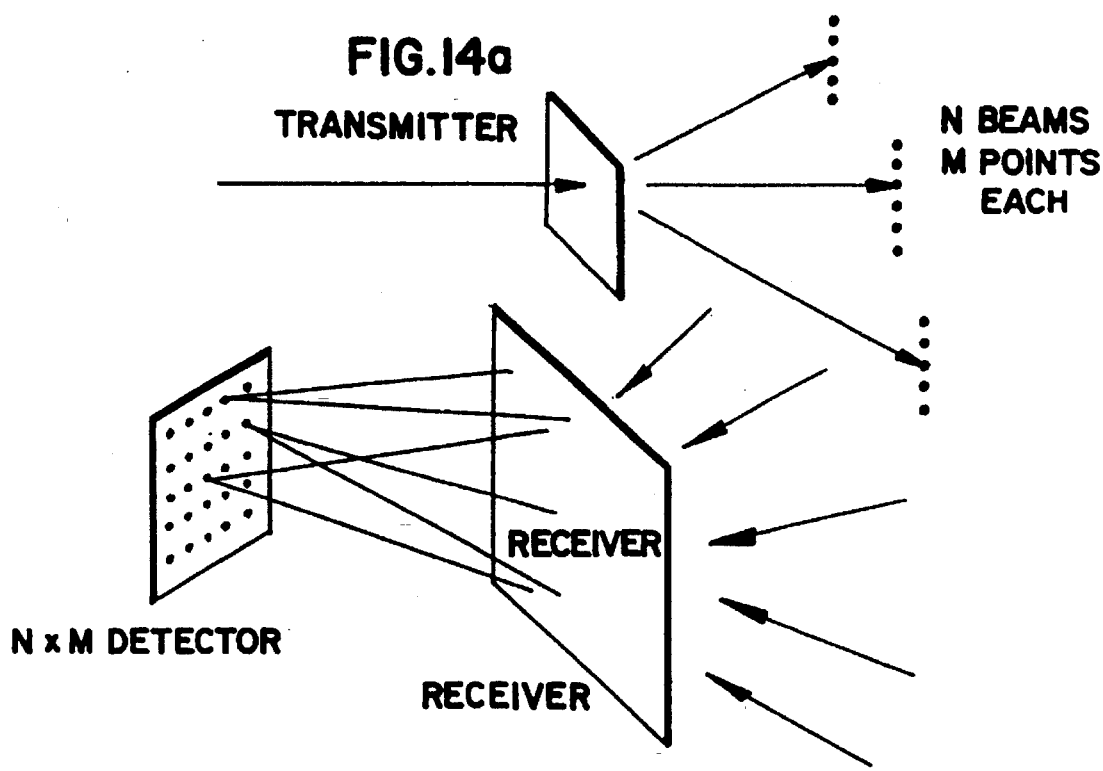
FIG. 14A diagrammatically illustrates a stationary non-scanning receiver.

As discussed above, many devices such as RADARs and bar code readers, illuminate or intercept targets of mutual interest (e.g., an aircraft or a bar code) with "scanned" radio waves or laser beams, and collect the subsequent reflected or scattered waves or beams ("return beams") to determine the characteristics of the target of interest. These return beams are generally collected in one of the two ways:

1. Stationary/non scanning receivers: The returns are collected normally using a large aperture system and focused on a one-dimensional or two-dimensional detector array, depending upon a one dimensional or two dimensional transmitted scan beam, as shown in FIG. 14A. Each element of the detector array corresponds to different direction of the transmitted scanned beam. The main disadvantage of this approach is that it requires a large array of detector elements to capture several directions of the transmitted beam. Furthermore, the receiver is generally suitable for one transmitted scan beam only.

Figure 14B:
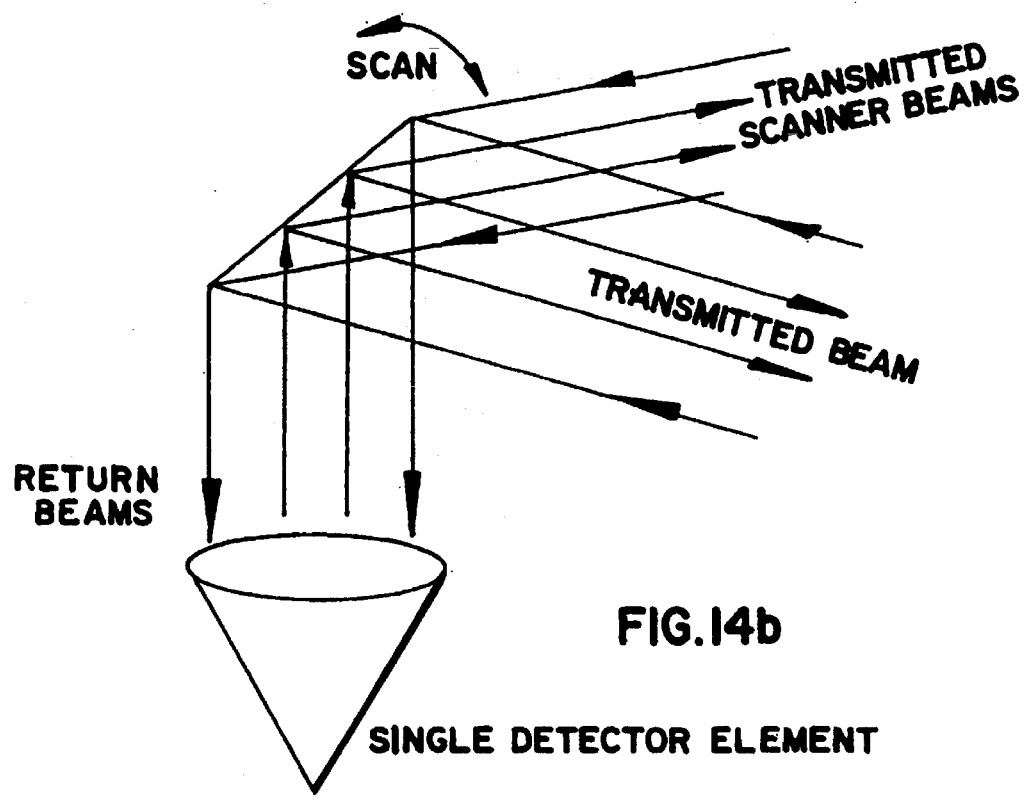
FIG. 14B diagrammatically illustrates a scanning receiver.

2. Scanning receivers: FIG. 14B shows the schematics of a scanned receiver, in which the receiver scans in-sync with the transmission scanning, and normally shares the scanning components with the transmitted beam. As a result, the return beam encounters "positive" (while being transmitted) and "negative" (during return path) scan, resulting in a null scan, and hence the location of return beam is independent of the scanning. Therefore, the return beam can be focused on a single detector element. For a multiple beam transmission scanner, the return beam could be collected on a single detector as well, in a similar manner.

Figure 15A:
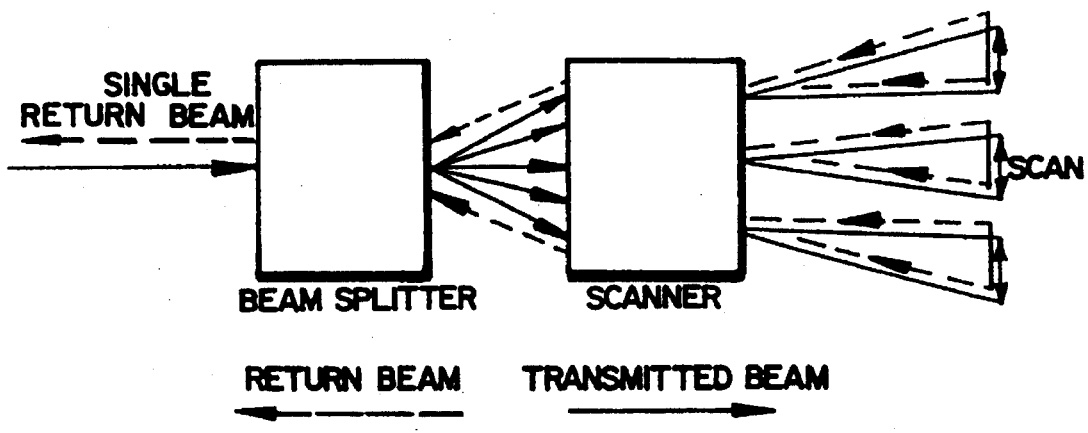
FIG. 15A illustrates both a transmitted and return beam going through both beam splitter and scanner, resulting in a single return beam.
Figure 15B:
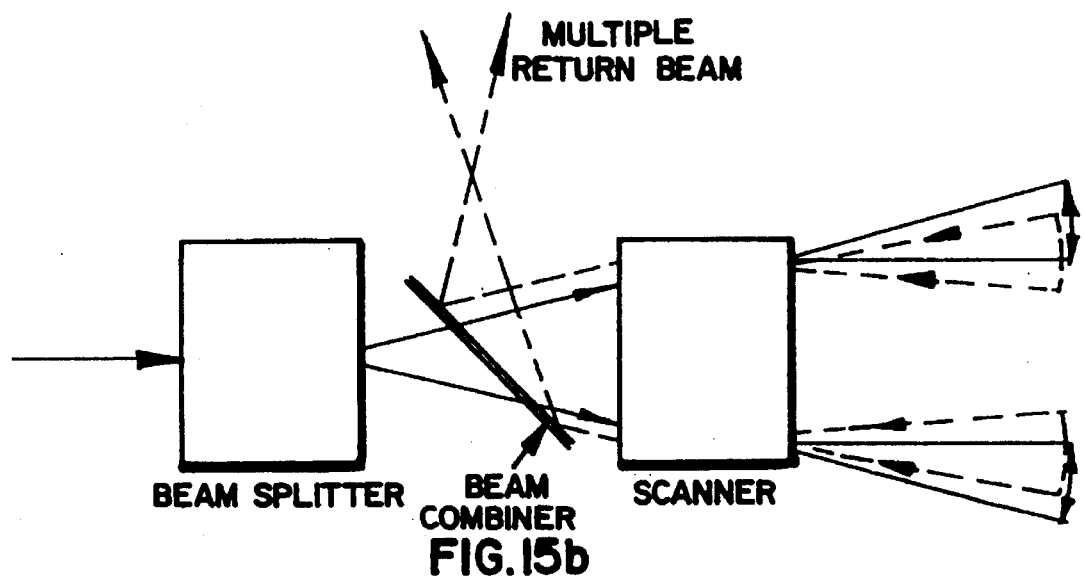
FIG. 15B illustrates a return beam which does not go through the beam splitter, resulting in multiple return beams.

If both the transmitted and return beams go through the scanning as well as the beam splitting mechanism (as shown in FIG. 15A), then the ultimate return beam experiences "null scan" as well as "null beam split." In the case of multiple beam scan systems, it is, however, generally required to keep the return beam separate and collect the multiple return beams on separate detectors, so that the characteristic returns of these multiple beams could be maintained. This, in principle, can be accomplished easily in those systems where the "beam splitting" components and the "scanning components" can be separated from each other (as shown in FIG. 15B). This can be accomplished by redirecting the return beam from entering the "beam splitting" components. Such an approach, however, results in poor efficiency due to 50% efficiency of the beam combiner in both transmission and receiver modes.

The processes for multiple beam splitting and scanning of multiple beams in one and/or two dimensions, using the same arrays of optical components for both functions has been discussed above. While this process is unique and advantageous for its intended use, the problem of collecting the multiple scan beam returns on separate detectors is even more challenging due to:

The problems encountered including first the necessity of a high efficiency transmission and receiver system, while collecting the "n" return beams on "n" separate detectors. Additionally, the system required the necessity of ensuring that for a receiver mode, both "positive scanning" and "negative scanning" are truly compensating to result in "null scan" at all times. By positive and negative scanning, what is meant is the transmission and receiving paths taken by the beam of light. In the embodiments described herein, since the receive and transmit elements are mounted on the same plate, the light will always result in a null scan.

Figure 16:
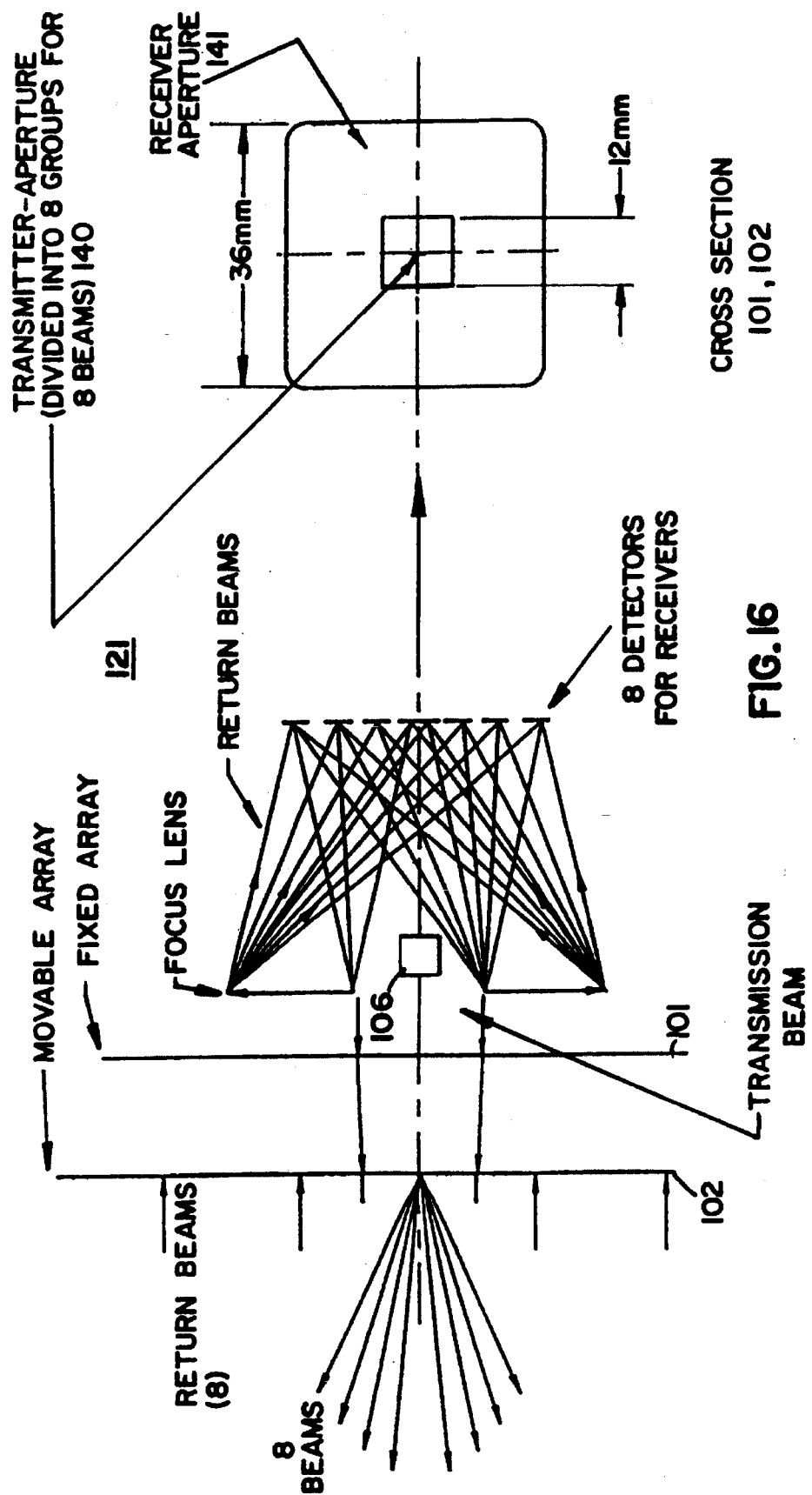
FIG. 16 diagrammatically illustrates the components of an eight-beam transmitter and receiver.

An example of a preferred embodiment of the present invention to collect these multiple scanned beams returns using array of optical elements such as BOCs, is shown in FIG. 16. The OAST-R is designated generally by 121. It will be appreciated by those skilled in the art that the receiver function is implemented by surrounding the transmission array 140 of optical elements with identical array elements with zero offset, wherein these outside array elements 141 are used for collecting the returns. Since the offset is zero, all these array elements are identical and, therefore, these elements would not perform beam splitting. On the other hand, since these array elements are located on the same substrate as the transmission elements, and since the scanning is accomplished by the mechanized motion of the entire substrate, the return beam would experience the "negative" scanning in-sync with the transmission beams (i.e., all array elements move identically), and therefore result in null scan.

The overall impact of the foregoing device is that the multiple return beams experience "null scan," but not the "null beam splitting." Therefore, the return beams can be collected on an array of "n" detectors 114, one for each of the multiple scan beams. A lens 113 may be used to focus the return beams onto the detector array 114 (see FIG. 3).

Example of a Preferred Embodiment OAST-R

One example of a preferred embodiment collector can be implemented using binary optic arrays. In particular, the device can be fabricated with two arrays of overall dimensions of 36 mm×36 mm. The central 12 mm×12 mm portion 140 is designated for dividing the input beam into eight (8) beams and performing the two dimensional scans per parameters discussed previously. The outer portion 141 of the array includes identical elements with zero offset. Currently, collecting the return beams on an array of eight (8) detector elements has been achieved. In the preferred embodiment, during beam splitting and subsequent two dimensional scanning of eight beams, the returns beams are collected separately on separate detector elements, and the position of the detectors 114 remains stationary, independent of the scan beam directions.

A detector which could be used, for example, is manufactured by RCA Electrooptics having a designation Photodiode C30985E. Those skilled in the art will recognize that separate detectors or an array detector may be utilized dependent upon the application of the present invention, and that the type of detector will vary depending on the laser and the application itself.

Binary Element Processing/Fabrication

Binary elements, which are typically chrome-on-glass components, are processed to increase their diffraction efficiency. A brief summary of this processing is presented in this section.

As an introduction, a diffractive optical element focuses, or bends, light through diffraction rather than the reflection or refraction phenomena observed with conventional lenses or mirrors. Diffraction is most commonly observed when light encounters either periodic structures or regions where the transmission changes abruptly. The simplest common diffractive element is a grating used in spectroscopic applications. More complex diffractive elements have traditionally been recorded using holographic techniques. These can be as simple as a holographic lens, or as complex as the hologram imprinted on credit cards.

Computer generated holography ("CGH") uses computer modeling to generate the periodic structure in a complex diffractive element. The biggest challenge in fabricating a CGH is achieving high diffraction efficiency. In an ideal case, the surface profile within the periodic structure will be parabolic. Using a linear approximation to this curve results in a diffraction efficiency of 99%.

Figure 17C:
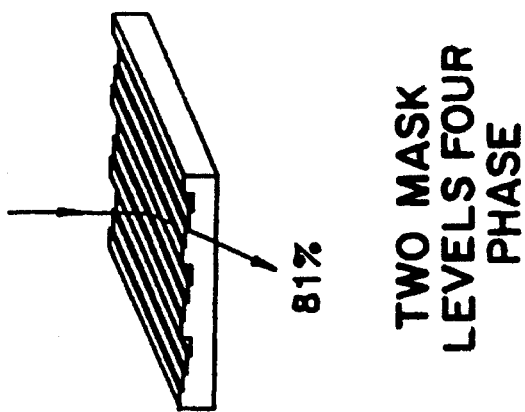
FIGS. 17A–17C illustrate the computer graphic hologram diffraction efficiency.
Figure 17B:
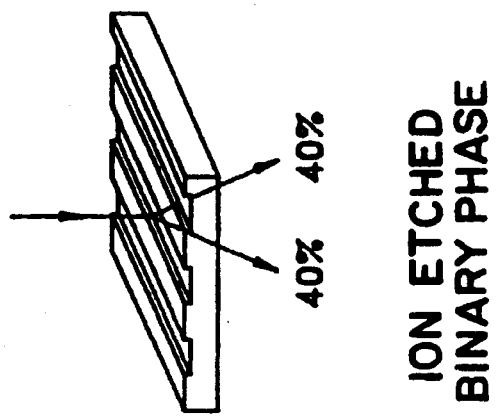
Figure 17A:
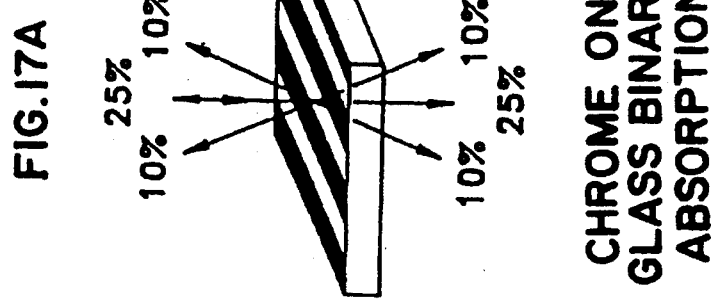

The fabrication of a CGH employs many methods borrowed from semiconductor fabrication. The output from the computer is the information to make a photomask which contains the periodic structure. As shown in FIG. 17, this chrome on glass hologram has a diffraction efficiency of only 10%, there is no differentiation between the desired first 1st and the −1st order, and 25% of the light passes through the mask undiffracted.

The efficiency can be improved by etching the mask to achieve a binary phase relief hologram. The etching process removes material where the mask is unprotected, leaving only a binary structure of high and low areas. This process eliminates the undiffracted light, increases the diffraction efficiency to 40%, and still does not differentiate between the 1st and −1st orders. Increasing the complexity of the device and using two masks to achieve four phase levels can improve the efficiency to 81%, while using three masks to achieve eight phase levels can increase the efficiency to 95%.

Figure 18:
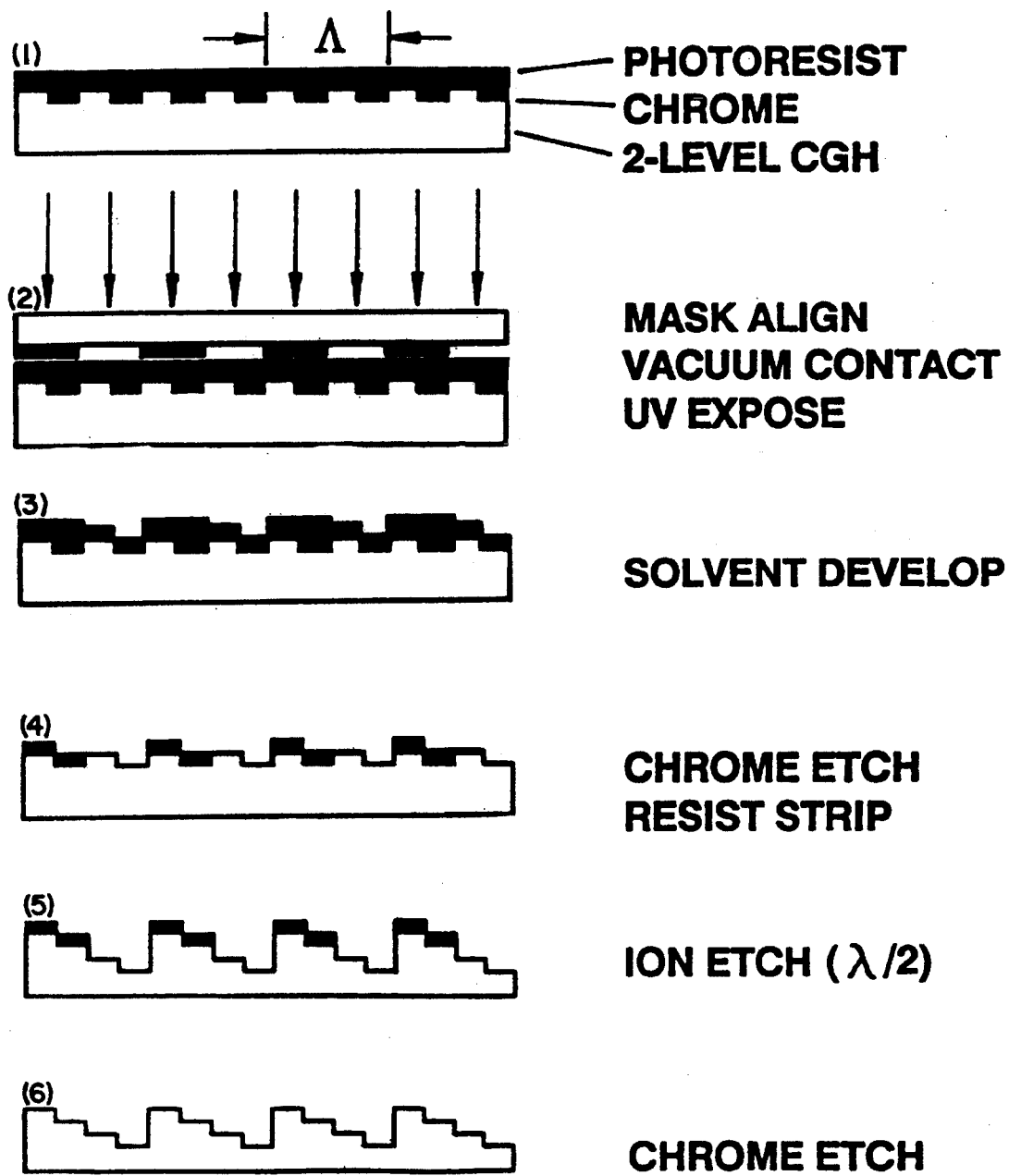
FIG. 18 illustrates the steps in a multilevel CGH.

The process for fabricating a four level CGH is shown in FIG. 18 by steps 1–6. Here, a chrome on glass CGH has been etched to form a binary CGH, and the entire surface has had a layer of chrome and a layer of photoresist deposited on it in the upper diagram. The next diagram shows a second (coarser) pattern being transferred into the photoresist by contact printing. The photoresist is developed, and the chrome is stripped where the photoresist was exposed to yield a chrome on glass pattern to be etched. Chrome is preferred over photoresist as an etch mask because it is etched far less than photoresist in the RIE process. After the RIE etch of the substrate, the remaining chrome is stripped. The part may be complete at this point, or it may be ready to repeat the process to obtain an eight, or even sixteen level device.

When fabricating these devices, there are several considerations for the mask design. Through the use of an automated lens design program, it is possible to generate a phase distribution function which dictates the ideal location of each fringe edge in the CGH. The greatest challenge in the design of the photomask is the accurate placement of the fringe edges. The language of the mask writing equipment describes each mask as collection of trapezoidal (or triangular) areas in which the chrome is to be removed from the photomask. Further, the photomask generation equipment writes the mask after rasterizing the pattern with a particular address size. Typically, the address resolution is 0.1, 0.25, or 0.5 micron, and the minimum width feature which can be written is about 8 pixels wide. The eight pixel limitation sets a maximum spatial frequency of the phase pattern of 1551/mm for an eight phase level mask written with 0.1 micron address size. This will diffract 543 nm light by only 4.9°. For an eight phase mask, the maximum spatial frequency is 3101/mm.

The CGH pattern required for certain applications has only bilateral symmetry, and hence needs a very general algorithm for finding fringe edges. The approach chosen is to evaluate the phase function on a fine grid of positions and perform a linear interpolation to find the fringe edges. The grid spacing is typically chosen to be as large as possible while the linear interpolation produces errors of less than one twentieth of wave in the phase function. This encoding accuracy can be changed to suit the needs of the project. Other encoding methods which can be used if the phase function is a relatively small perturbation from a linear grating, or if the fringe pattern has rotational symmetry.

Further CGH fabrication areas must also be considered. For example, once the mask is fabricated, the phase relief pattern must be etched into the substrate. For one application CGH, the substrate was chosen to be the finest level photomask. This reduces the number of lithography steps. In other cases, a photomask blank is not an acceptable substrate, so even the finest pattern must be transferred to the substrate.

The efficiency of the final device is governed primarily by three parameters; the alignment accuracy, the duty cycle, and the etch depth. The most critical factor is the alignment accuracy. FIG. 19b shows the ideal etch depth profile for an 8 level mask. FIG. 19a shows the etch depth profile with a misalignment of the finest mask of only 1% of the fundamental period. This is sufficient to reduce the diffraction efficiency from 95% to 90%. Subjectively, the small spike in etch depth introduced by the misalignment acts to diffract light into high orders through the inclusion of the small feature. If this level of misalignment (1% of the fundamental period) is to be achieved on the finest eight level CGH, then alignment accuracies of 0.06 micron must be achieved. This is at the extreme edge of the state of the art for photomask alignments.

The duty cycle describes the width of an etched feature relative the width of the unetched adjacent feature. Ideally, the width of the etched area is exactly half of the etched-unetched pair width. If the width of the features on the finest mask are 13.5% of the fundamental period rather than the ideal 12.5%, the diffraction efficiency falls to 92.5%. This corresponds to a duty cycle of 54% for the finest features. The duty cycle is controlled primarily by the exposure time when the pattern is transferred from the mask to the substrate. It can be adjusted by intentionally making the photomask with features with a duty cycle which differs from 50%.

The third contributor to the efficiency is the etch depth. This is less sensitive than the duty cycle or alignment. An error in the etch depth on the finest level of 20% causes the efficiency to fall by only 0.5%. The other levels are somewhat more sensitive. Another consideration in the etch depth is the uniformity over the plate. The gas plasma, or Reactive Ion Etching ("RIE"), process used by APA Optics, the Assignee of the present invention, tends to have five to ten percent etch depth variation over parts as large as other types of CGH applications.

In the preferred embodiment examples, the BOCs binary elements will be constructed using up to three (3) mask levels, with a theoretical diffraction efficiency of 95% of each of the elements. The binary element (or CGH) for the third mask level would be used as the substrate for the element. It would not, therefore, include any patterning but etching only. Subsequently, the second level masks and first level masks, will be patterned and etched respectively. The etch depth for each of the three mask levels are presented below:

| Mask Level | Etch Depth |
| --- | --- |
| Third Level | 2,956 A - 1/8 wave |
| Second Level | 5,912 A - 1/4 wave |
| First Level | 1'1,824 A - 1/2 wave |

Figure 20A:
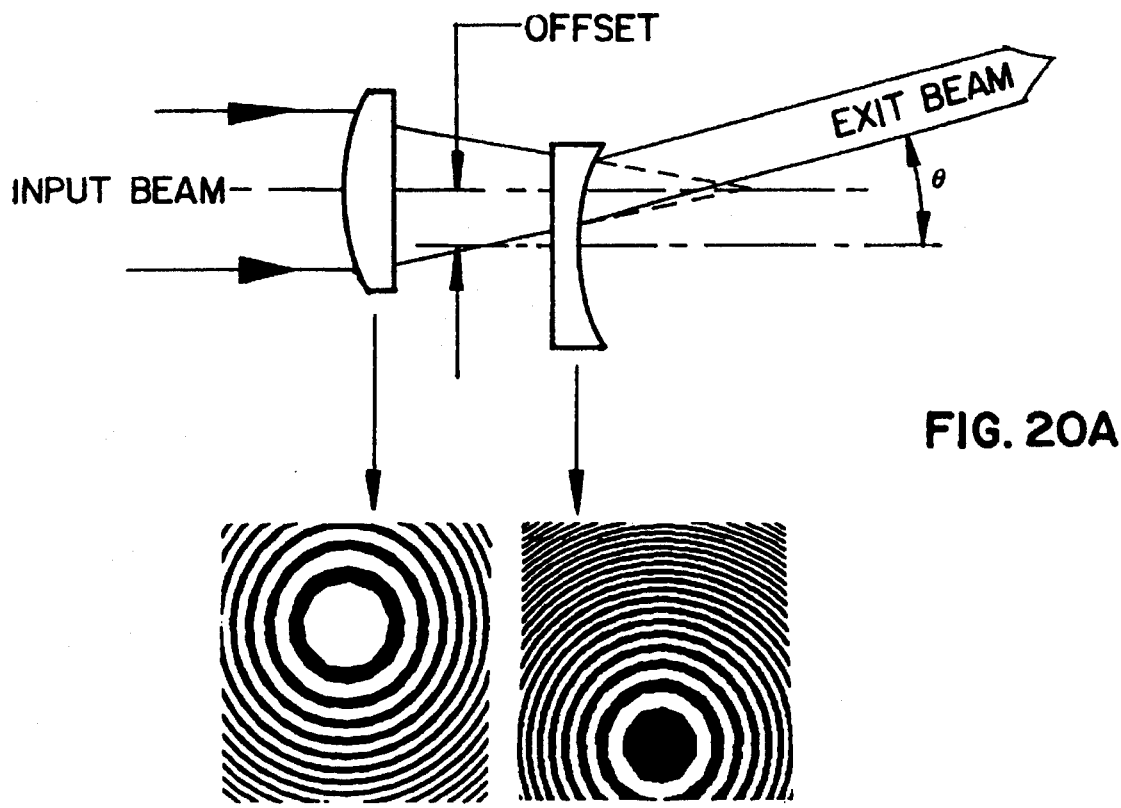
FIGS. 20A–20B illustrate two different sets of BOC array elements for generating useful scanning applications.
Figure 20B:
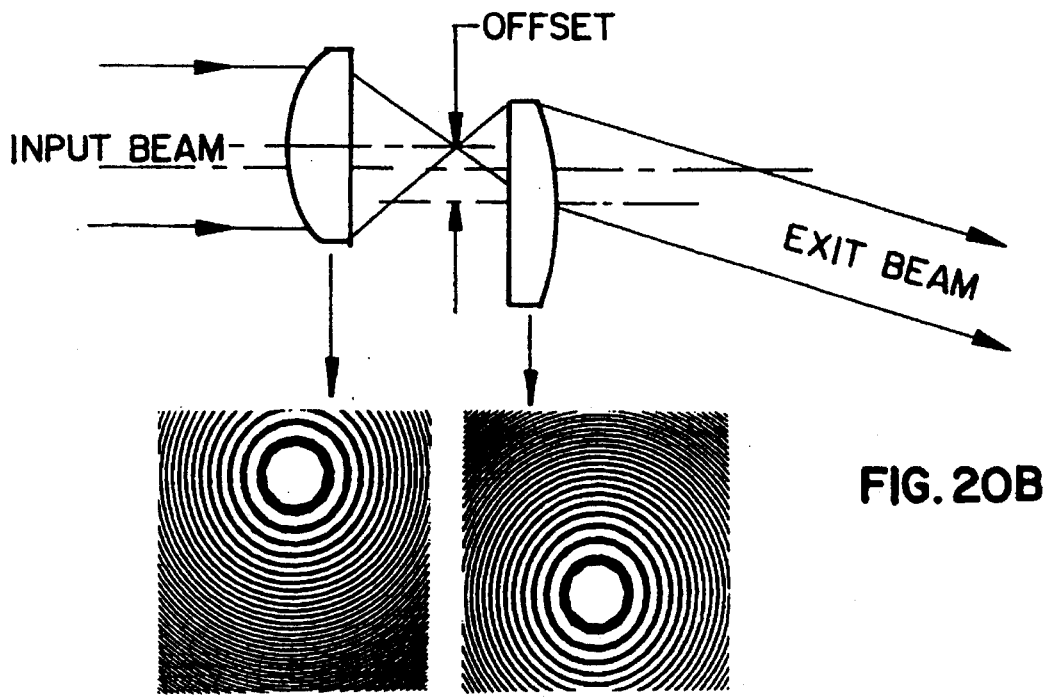

It is to be understood that even though numerous characteristics and advantages of the present invention have been set forth in the foregoing description, together with details of the structure and function of the invention, the disclosure is illustrative only and changes may be made in detail, especially in the fabrication techniques, the number of levels, and the number of arrays. For example with regard to the latter, the array may include a collection of sub-arrays, and each of these sub-arrays may be different, resulting in a set of differing sets of multiple beams (each set corresponding to a different sub-array). Furthermore, the parameters of those sub-arrays could, in principle, be designed such that each set of the multiple beams may provide different scan angle coverages. For example, as illustrated in FIG. 20B, different components having differing optical powers may be utilized, resulting in both split beams and beams which are scanned in different directions. Those skilled in the art will recognize that at high optical powers, the shapes of the rings are much smaller to start with. Also, the "bullseye" in FIG. 20 is transparent as compared to its counterpart which is opaque. This is due to positive versus negative lens.

Therefore, the resulting scan using embodiments of the present invention may be used to scan lines, planes, or multiple planes with several of the split beams. Additionally, the beams may scan an area dependent upon a control algorithm used to control the drivers. Therefore, those skilled in the art will recognize that scanning of devices (such as the drums of laser printers) may be easily affected through use of devices constructed in accordance with the principles of this invention. Still further, by differing the optical powers and/or the resulting angles between the split beams, a beam with half the magnitude angle will scan one-half the area of that of a second beam (at a plane an equidistance away). Accordingly, sub-arrays may be generated which have different scanning properties which may be useful for different applications.

Other modifications and alterations are well within the knowledge of those skilled in the art and are to be included within the broad scope of the appended claims.

What is claimed is:

1. An apparatus for splitting a beam of light comprising:
   a) a first binary optical component and a second binary optical component;
   b) wherein said first binary optical component includes a first array of n×m identical optical elements and said second binary optical component includes a second array of optical elements which correspond on a one-to-one basis to said first array;
   c) wherein each of said elements of said first and second array defines an optical axis;
   d) wherein each of said optical axes of said elements of said second array are offset from the corresponding said optical axis of said elements of said first array, wherein light is diffracted by said first binary component and said second binary component into a number of beams equal to the product of n×m; and
   e) wherein each of said elements of said first and second arrays is subdivided into an array of o×p sub-elements, wherein each of said o×p sub-elements include a predetermined number of identical elements "Q" such that (o×p)/Q equals the number of different offsets corresponding to the desired- number of output beams.

2. The apparatus of claim 1, wherein said first binary component and said second binary component are located on the same substrate.

3. The apparatus of claim 2, further comprising means for varying the geometrical position of at least one of said first and second binary components relative to said other binary components, whereby the offsets are varied over time and said split beams are scanned.

4. The apparatus of claim 3, wherein said means for varying includes a piezo driver device which is controlled by a microprocessor.

5. An apparatus for splitting a beam of light into a plurality of output beams, comprising:
   a) a first miniaturized array of at least one binary optical component;
   b) a second miniaturized array of at least one binary optical component, wherein each of said components on said second array maps into one of said components on said first array, whereby sets of corresponding components on said first and second array are defined, and wherein at least one of said binary optical components is offset and the beam of light is split into two or more output beams; and
   c) wherein each of said corresponding components of said second array are offset from said corresponding components of said first array, whereby each defined set of corresponding components includes a different offset, whereby output beams having differing directions are created.

6. The apparatus of claim 5, further comprising means for varying the geometrical position of at least one of said first and second miniaturized arrays relative to said other miniature array, whereby the offsets are varied over time and said output beams are scanned.

7. The apparatus of claim 6, wherein said means for varying includes a piezo driver device which is controlled by a microprocessor.

8. The apparatus of claim 6, further comprising means for collecting said scanned beam, means for focusing said collected beams, and detector means for receiving said focussed beams and for detecting the intensity level of said collected beam.

9. The apparatus of claim 8:
   a) wherein said components of said first array are all located on a first single substrate and said components of said second array are all located on a second single substrate; and
   b) wherein said collecting means is located on one of said first and second substrates.

10. The apparatus of claim 5, further comprising means for collecting said scanned beams, means for focusing said collected beams, and detector means for receiving said focussed beams and for detecting the intensity level of said collected beam.

11. An apparatus for splitting a beam of light comprising:

a) a first binary optical component and a second binary optical component;

b) wherein said first binary optical component includes a first array of n×m identical optical elements and said second binary optical component includes a second array of optical elements which correspond on a one-to-one basis to said first array;

c) wherein each of said elements of said first and second array defines an optical axis;

d) wherein each of said optical axes of said elements of said second array are offset from the corresponding said optical axis of said elements of said first array, whereby light is diffracted by said first binary component and is split by said second binary component into a number of beams equal to the product of n×m; and e) wherein each of said elements of said first and second arrays is subdivided into an array of o×p sub-elements, wherein each of said o×p sub-elements include a predetermined number of identical elements "Q" such that (o×p)/Q equals the number of different offsets corresponding to the desired number of output beams.

12. The apparatus of claim 11, wherein said first binary component and said second binary component are located on the same substrate.

13. The apparatus of claim 12, further comprising means for varying the geometrical position of at least one of said first and second binary components relative to said other binary components, whereby the offsets are varied over time and said output beams are scanned.

14. The apparatus of claim 13, wherein said means for varying includes a piezo driver device which is controlled by a microprocessor.

15. The apparatus of claim 14, further comprising means for collecting said scanned beam, means for focusing said collected beams, and detector means for receiving said focussed beams and for detecting the intensity level of said collected beam, and wherein said collecting means is located on one of said substrates.

* * * * *